(12) United States Patent
Heo et al.

(10) Patent No.: US 8,968,954 B2
(45) Date of Patent: Mar. 3, 2015

(54) FUEL CELL SYSTEM AND METHOD OF CONTROLLING REACTION CONDITION OF FUEL IN FUEL CELL

(75) Inventors: Jin S. Heo, Hwaseong-si (KR); Hye-jung Cho, Anyang-si (KR); Young-jae Kim, Seoul (KR); Jong-rock Choi, Seoul (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 157 days.

(21) Appl. No.: 13/345,955

(22) Filed: Jan. 9, 2012

(65) Prior Publication Data

US 2012/0178008 A1 Jul. 12, 2012

(30) Foreign Application Priority Data

Jan. 10, 2011 (KR) ........................ 10-2011-0002339

(51) Int. Cl.
*H01M 8/04* (2006.01)

(52) U.S. Cl.
USPC ............................ 429/449; 429/434; 429/443

(58) Field of Classification Search
USPC .......................................... 429/434, 443, 449
See application file for complete search history.

(56) References Cited

U.S. PATENT DOCUMENTS

| 2005/0181246 A1 | 8/2005 | Nakaji |
| 2007/0259224 A1 | 11/2007 | Tung et al. |
| 2007/0264544 A1 | 11/2007 | Jang et al. |
| 2007/0264548 A1 * | 11/2007 | Yagi et al. ........................ 429/24 |
| 2008/0075988 A1 * | 3/2008 | Suzuki et al. .................... 429/19 |
| 2009/0047555 A1 * | 2/2009 | Sugawara et al. ............... 429/19 |
| 2010/0323261 A1 | 12/2010 | Igarashi et al. |

FOREIGN PATENT DOCUMENTS

| DE | 10-2007-020749 A1 | 11/2007 |
| DE | 10 2007-020749 A1 | 11/2007 |
| DE | 10 2008-029180 A1 | 12/2009 |
| DE | 10-2008-029180 A1 | 12/2009 |
| EP | 1855343 A1 | 11/2007 |
| JP | 61-058170 A | 3/1986 |
| JP | 2005166540 A * | 6/2005 |
| JP | 2008-293965 A | 12/2008 |
| JP | 2009-134886 A | 6/2009 |
| JP | 2009-231167 A | 10/2009 |
| JP | 2010-020923 A | 1/2010 |
| JP | 2010-033901 A | 2/2010 |
| WO | WO 2009/104090 A1 | 8/2009 |

OTHER PUBLICATIONS

Machine Translation of JP 2005-166540.*
European Search Report in EP 12150633.1-1227/2475039, dated Sep. 25, 2012 (HEO, et al.).
European Search Report in EP 12150633.1-1227, dated Apr. 20, 2012.

* cited by examiner

*Primary Examiner* — Jonathan Jelsma
(74) *Attorney, Agent, or Firm* — Lee & Morse, P.C.

(57) ABSTRACT

A target value of each of factors in a fuel cell system is determined based on a correspondence relationship of a change in each of the factors determining reaction conditions of fuel in a fuel cell to a change in an external environment of the fuel cell system, and peripheral devices of the fuel cell affecting the reaction conditions of the fuel in the fuel cell are controlled according to a target value of each of the factors.

19 Claims, 7 Drawing Sheets

FUEL CELL SYSTEM AND METHOD OF CONTROLLING REACTION CONDITION OF FUEL IN FUEL CELL

BACKGROUND

1. Field

Embodiments relate to a fuel cell system and a method of controlling a reaction condition of fuel in a fuel cell of the fuel cell system.

2. Description of the Related Art

Together with a solar cell and the like, a fuel cell is drawing attention as an eco-friendly alternative energy source for generating electrical energy. A fuel cell may be used to generate electrical energy from substances abundant on the earth, for example, hydrogen. To produce power from a fuel cell, fuel, water, air, and the like are fed to the fuel cell.

SUMMARY

An embodiment is directed to a method of controlling reaction conditions of fuel in a fuel cell of a fuel cell system, the method including obtaining information regarding a current external environment of the fuel cell system, determining a target value of each of factors which determine the reaction conditions of the fuel in the fuel cell, the target value varying corresponding to the obtained information, the determination of the target value being based on a correspondence relationship of a change of each factor with respect to a change in an external environment of the fuel cell system, and controlling peripheral devices of the fuel cell which affect the reaction conditions of the fuel in the fuel cell according to the target value of each of the factors.

In the controlling of the peripheral devices, the peripheral devices may be controlled such that a current value of each of the factors follows the target value of each of the factors by using a difference between the target value of each of the factors and the current value of each of the factors measured in the fuel cell system.

The factors may include a temperature of the fuel cell, and controlling the peripheral devices may include controlling a pump for supplying the fuel to the fuel cell such that a current temperature of the fuel cell follows a target temperature of the fuel cell by using a difference between the target temperature of the fuel and the current temperature of the fuel cell.

Controlling the peripheral devices may include calculating a target concentration of the fuel supplied to the fuel cell from the difference between the target temperature of the fuel cell and the current temperature of the fuel cell, and controlling the pump such that a current concentration of the fuel follows the target fuel concentration to make the current temperature of the fuel cell follow the target temperature.

Controlling the peripheral devices may include estimating a difference between the target fuel concentration supplied to the fuel cell and the current fuel concentration of the fuel cell from the difference between the target temperature and the current temperature of the fuel cell and a difference between a target output of the fuel cell and a current output of the fuel cell, and controlling the pump according to the estimated value to make the current temperature of the fuel cell follow the target temperature.

The factors may include a temperature of the fuel supplied to the fuel cell, and controlling the peripheral devices may include controlling at least one of a heat-exchanger positioned at a pipe where the fuel supplied to the fuel cell flows and a fan attached to the heat-exchanger such that a current temperature of the fuel follows a target temperature by using a difference between the target temperature of the fuel and the current temperature of the fuel.

The factors may include an amount of water retrieved from the fuel cell, and controlling the peripheral devices may include controlling at least one of a heat-exchanger positioned at a pipe where water retrieved from the fuel cell flows and a fan attached to the heat-exchanger such that a current water level of the water retrieved from the fuel cell follows a target water level of the water retrieved from the fuel cell by using a difference between the target water level of the water retrieved from the fuel cell and the current water level of the water retrieved from the fuel cell.

The factors may include at least one of a temperature of a surface of the fuel cell, a temperature of the fuel, and an amount of water retrieved from the fuel cell.

Controlling the peripheral devices may include simultaneously controlling the peripheral devices according to the target value of each of the temperature of the surface of the fuel cell, the temperature of the fuel cell, and the amount of the water retrieved from the fuel cell.

The information may include information regarding at least one of a current external temperature and current external humidity of the fuel cell system.

The correspondence relationship may be a nonlinear correspondence relationship of the change in each factor with respect to a change in an external temperature of the fuel cell system.

The correspondence relationship may include a correspondence relationship of a change in each factor to a change in a temperature between a lowest point and a highest point of a predetermined temperature section.

The correspondence relationship may include a correspondence relationship of a change in each factor to a change in a temperature in each of a plurality of sub-sections of the predetermined temperature section.

The sub-sections may include first to third sub-sections, and the correspondence relationship may include a first function in the first sub-section, a second function in the second sub-section, and a third function in the third sub-section.

Each of the first to third functions may be any one of a linear function and a nonlinear function.

Another embodiment is directed to a computer-readable recording medium including a program for executing, in a computer, a method of controlling reaction conditions of fuel in a fuel cell of a fuel cell system, the method including obtaining information regarding a current external environment of the fuel cell system, determining a target value of one or more factors which determine the reaction conditions of the fuel in the fuel cell, the target value varying corresponding to the obtained information, the determination of the target value being based on a correspondence relationship of a change of each factor with respect to a change in an external environment of the fuel cell system, and controlling peripheral devices of the fuel cell which affect the reaction conditions of the fuel in the fuel cell according to the target value of each of the factors.

Another embodiment is directed to a fuel cell system, including a fuel cell configured to produce power by using fuel, a Balance of Plant (BOP) configured to supply at least fuel to the fuel cell, and a controller configured to simultaneously control peripheral devices of the fuel cell in the BOP according to a varying target value of each of factors determining reaction conditions of the fuel in the fuel cell in a current external environment of the fuel cell system.

The controller may determine a target value of each of the factors based on a correspondence relationship of a change in each of the factors with respect to a change in an external environment of the fuel cell system.

Another embodiment is directed to a method of controlling a concentration of fuel supplied to a fuel cell of a fuel cell system, the method including calculating a difference between a target temperature of the fuel call and a current temperature of the fuel cell, calculating a difference between a target output of the fuel cell and a current output of the fuel cell, estimating a difference between a target fuel concentration and a current fuel concentration from the calculated difference values, and controlling a peripheral device of the fuel cell affecting the concentration of the fuel according to the estimated difference value.

Estimating the difference between the target fuel concentration and the current fuel concentration may include multiplying the calculated difference values by weight values, and adding the difference values multiplied by the weight values.

Calculating the difference between the target temperature of the fuel cell and the current temperature of the fuel cell may include calculating the difference between the target temperature of the fuel cell and the current temperature of the fuel cell at a current external temperature of the fuel cell system, and estimating the difference between the target fuel concentration and the current fuel concentration may include estimating the difference between the target fuel concentration and the current concentration of the fuel cell at the current external temperature of the fuel cell system.

Another embodiment is directed to a computer-readable recording medium including a program for executing, in a computer, a method of controlling the concentration of fuel supplied to a fuel cell of a fuel cell system, the method including calculating a difference between a target temperature of the fuel call and a current temperature of the fuel cell, calculating a difference between a target output of the fuel cell and a current output of the fuel cell, estimating a difference between a target fuel concentration and a current fuel concentration from the calculated difference values, and controlling a peripheral device of the fuel cell affecting the concentration of the fuel according to the estimated difference value.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
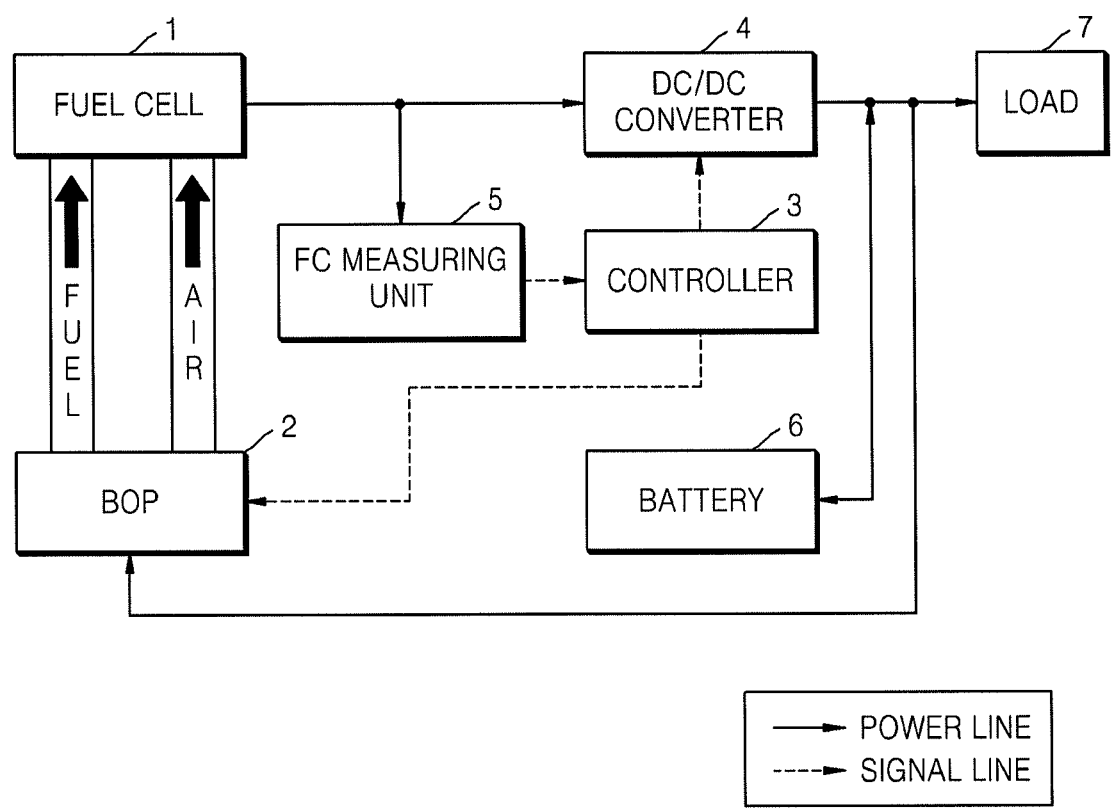
FIG. 1 illustrates a block diagram of a fuel cell system according to an example embodiment.

The present application claims the benefit of priority to Korean Patent Application No. 10-2011-0002339, filed on Jan. 10, 2011, in the Korean Intellectual Property Office, the disclosure of which is incorporated herein by reference in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, dimensions may be exaggerated for clarity of illustration. It will be understood that when an element is referred to as being "on" another element, it can be directly on the other element, or one or more intervening elements may also be present. It will also be understood that when an element is referred to as being "under" another element, it can be directly under, or one or more intervening elements may also be present. It will also be understood that when an element is referred to as being "between" two elements, it can be the only element between the two elements, or one or more intervening elements may also be present. Like reference numerals refer to like elements throughout.

FIG. 1 illustrates a block diagram of a fuel cell system according to an example embodiment.

In the present example embodiment, a fuel cell system includes a fuel cell for generating power, a Balance of Plant (BOP) having peripheral devices for the fuel cell (for supplying fuel, water, air, and the like to the fuel cell), and a converter for converting power output from the fuel cell and supplying the converted power to a load.

Embodiments are applicable to the BOP for supplying fuel, water, air, and the like. Details of other constituents of the fuel cell system, such as a stack, a converter, and the like, other than the BOP, may be omitted for clarity.

In general, a fuel cell may be designed in the form of a stack having a plurality of cells combined in parallel or in series, according to a power required by a load. Hereinafter, both a single cell and a stack of a plurality of cells will be simply referred to as a fuel cell.

In the example embodiment shown in FIG. 1, the fuel cell system includes a fuel cell 1, a Balance of Plant (BOP) 2, a controller 3, a Direct Current/Direct Current (DC/DC) converter 4, a Fuel Cell (FC) measuring unit 5, and a battery 6. In the fuel cell system depicted in FIG. 1, the fuel cell 1 supplies generated power to at least one of the load 7 and the battery 6. The fuel cell system depicted in FIG. 1 has a hybrid structure in which output power of at least one of the fuel cell 1 and the battery 6 is supplied to a load 7 according to an output change of the fuel cell 1.

The fuel cell system depicted in FIG. 1 is merely an example. It will be apparent to those skilled in the art that various modifications and variations can be made without departing from the spirit or scope of the invention. For example, at least one converter may be added to the configuration depicted in FIG. 1.

The fuel cell 1 is a power generation unit that generates DC power by directly changing chemical energy of fuel into electrical energy by using an electrochemical reaction. As examples of the fuel cell, there may be a Solid Oxide Fuel Cell (SOFC), a Polymer Electrolyte Membrane Fuel Cell (PEMFC), a Direct Methanol Fuel Cell (DMFC), and the like.

The battery 6 serves as a power source for, e.g., starting the fuel cell 1, as a power source for the load 7 together with the fuel cell 1, etc. Such a fuel cell system equipped with a battery may be implemented as a portable fuel cell system due to its independent power generation capability. As the fuel cell of the portable fuel cell system, a DMFC, which may be smaller in size than other types of fuel cells, may be used.

In the example embodiment shown in FIG. 1, the FC measuring unit 5 measures an output state of the fuel cell 1. For example, the FC measuring unit 5 may measure an output state of the fuel cell 1 by measuring a value of an output current of the fuel cell 1. In another implementation, the FC measuring unit 5 may measure the output state of the fuel cell 1 by measuring a value of an output voltage of the fuel cell 1. In the present example embodiment, a case in which the output state of the fuel cell 1 is measured by using the value of the output current of the fuel cell 1 is described by way of example.

In the example embodiment shown in FIG. 1, the DC/DC converter 4 changes the output voltage of the fuel cell 1 according to the control of the controller 3. Surplus power remaining after output power of the DC/DC converter 4 is supplied may be used to charge the battery 6. The DC/DC converter 4 may change the output voltage of the fuel cell 1 according to the control of the controller 3 such that a constant current is output from the fuel cell 1. This is a case where the fuel cell system is performing a constant-current operation, in which a constant current is output from the fuel cell 1. In another case, the DC/DC converter 4 may change the output voltage of the fuel cell 1 according to the control of the controller 3 such that a constant voltage is input to the load 7. This is a case where the fuel cell system is performing a constant-voltage operation, in which a constant voltage is output from the fuel cell 1.

In the example embodiment shown in FIG. 1, the BOP 2 drives the fuel cell 1 according to the control of the controller 3. In the present example embodiment, the BOP 2 has peripheral devices for driving the fuel cell 1 according to the control of the controller 3, and may include a pump for supplying fuel, for example, a reformed gas with a high amount of hydrogen, methanol ($CH_3OH$), or the like (herein, this may be generally referred to as a fuel pump), a pump for supplying an oxidizing agent for oxidizing the fuel, for example, air, oxygen, or the like (herein, this may be generally referred to as an air pump), a pump for supplying water, and the like. In the fuel cell system depicted in FIG. 1, the fuel cell 1 is a DMFC, and fuel and air are supplied to the fuel cell 1 through the BOP 2. In this DMFC system, water ($H_2O$) used for generation of a suitable concentration of an aqueous methanol solution for power generation of the fuel cell 1 is supplied, not from outside the fuel cell system, but by retrieving water generated by the fuel cell 1 inside the fuel cell system.

Herein, the term "fuel concentration" will be used to refer to a concentration of the fuel as adjusted by, e.g., increasing or decreasing an amount of water in the fuel. For example, for a methanol fuel, a concentration of the fuel may be lowered by adding water thereto such that a ratio $CH_3OH/(CH_3OH+H_2O)$ decreases.

In the example embodiment shown in FIG. 1, the BOP 2 is normally driven by using power provided from the fuel cell 1, namely, power output from the DC/DC converter 4. However, if power from the fuel cell 1 is not provided or is insufficient, the BOP 2 may be driven by using power output from the battery 6. The BOP 2 drives the fuel cell 1 by supplying fuel, air, or the like to the fuel cell 1 according to the control of the controller 3. This enables power production of the fuel cell 1. Meanwhile, to operate a pump or the like constituting the BOP 2, a function of generating an appropriate control signal for the pump or the like may be implemented. For example, a function of generating a duty cycle indicating an on/off ratio of the pump operation, a control signal indicating the pump speed, or the like may be implemented.

The controller 3 controls the operation of the BOP 2 according to changes in the output state of the fuel cell 1, measured by the FC measuring unit 5. For example, the controller 3 may calculate a difference (which may be referred to as an "error") between a target current value and a present (current) output current value of the fuel cell 1, measured by the FC measuring unit 5, and control the operation of the BOP 2 based on the magnitude of the calculated difference. This may help appropriately distribute the power of the fuel cell 1 and the power of the battery 6 to the load 7 according to a change in the output state of the fuel cell 1 caused by a change in the load 7, a charge status of the battery 6, and the like.

When fuel and air are sufficiently supplied to the fuel cell 1 at an optimal temperature for an electrochemical reaction within the fuel cell 1, the fuel cell 1 becomes capable of outputting maximum power. When the fuel cell 1 outputs its maximum power in the above state, the highest current value which can be measured from the fuel cell 1 may be an example of the target current. The target current may vary according to a deterioration degree of the fuel cell 1 or the like. The deterioration of the fuel cell 1 may be caused by various factors such as age and use environment of the fuel cell 1. In particular, in the fuel cell system depicted in FIG. 1, the target current means the highest current value that can be measured from the fuel cell 1 when the maximum power is output from the fuel cell 1 and supplied to all of the load 7, the battery 6, and the BOP 2.

Meanwhile, as an example different from the example in which the present output current value of the fuel cell 1 is used as an index of the output state of the fuel cell 1, the controller 3 may control the operation of the BOP 2 according to a difference (i.e., an error) between a target voltage value and a present output voltage value of the fuel cell 1. In another example, the controller 3 may control the operation of the BOP 2 in consideration of changes in both the present output current value and the present output voltage value of the fuel cell 1. Those skilled in the art would appreciate that parameters other than the changes in the present output current value and the present output voltage value of the fuel cell 1 may be used to represent the output state of the fuel cell 1. Furthermore, the controller 3 may control the operation of the BOP 2 in consideration of an output state of the battery 6, together with the output state of the fuel cell 1.

In more detail, when the difference between the present output current value of the fuel cell and the target current is equal to or smaller than a threshold value for a predetermined period of time, the controller 3 may control an operation amount of the BOP 2 based on the magnitude of the difference between the output current value of the fuel cell 1 and the target current value, thus allowing the fuel cell 1 to produce power corresponding to power consumption of the load 7, charged power of the battery 6, and power consumption of the BOP 2.

Meanwhile, a large difference between the output current value of the fuel cell 1 and the target current means that less power is output from the fuel cell 1, e.g., because less fuel, air, and the like are supplied to the fuel cell 1. In contrast, a small difference between the output current value of the fuel cell 1 and the target current means that more power is output from the fuel cell 1, e.g., because more fuel, air, and the like are supplied to the fuel cell 1. The controller 3 may controls pumping amounts of the fuel pump, the air pump, and the like of the BOP 2 in inverse proportion to the magnitude of the difference between the present output current value of the fuel cell 1 and the target current value, thus controlling amounts of fuel, air, and the like supplied to the fuel cell 1 in inverse proportion to the magnitude of the difference between the present output current value of the fuel cell 1 and the target current value. This allows the fuel cell 1 to produce power corresponding to the power consumption of the load 7, the charged power of the battery 6, and the power consumption of the BOP 2.

When the present output current value of the fuel cell 1 is close to the target current value, an amount of power close to the maximum power of the fuel cell 1 is being output from the fuel cell 1 and being supplied to the load 7, the battery 6, and the BOP 2. That is, the present output current value of the fuel cell 1 being close to the target current value means that the output power of the fuel cell 1 satisfies the power consumption of the load 7 while being used to charge the battery 6.

If the power consumption of the load 7 rapidly increases, both the fuel cell 1 and the battery 6 may supply power to the load 7 at the same time. In this case, the battery 6 is temporarily not charged. As illustrated in FIG. 1, since an output line of the DC/DC converter 4 and an output line of the battery 6 are connected to the load 7, the output of the fuel cell 1 and the output of the battery 6 according to a change in the load 7 is determined depending on a difference among an output voltage of the DC/DC converter 4, an output voltage of the battery 6, and an input voltage of the load 7.

If the battery 6 is fully charged when the difference between the present output current value of the fuel cell 1 and the target current value is equal to or smaller than a threshold value, power may no longer be supplied to the battery 6. When the battery 6 is in a fully charged state, the output power of the fuel cell 1 is supplied to only the load 7 and the BOP 2. Thus, unless the load 7 is rapidly changed, the amount of power being output from the fuel cell 1 is to be decreased. The threshold value means a difference between the target current value and the present output current value of the fuel cell when the battery 6 has been fully charged. This threshold value may be determined by measuring an output current value of the fuel cell 1 when the battery 6 is fully charged in the state where the load 7 having a specific power consumption is connected to the fuel cell system illustrated in FIG. 1.

In the fuel cell system illustrated in FIG. 1, to increase efficiency thereof, the fuel cell 1 may stop producing power when the battery 6 is fully charged, such that only the battery 6 supplies power to the load 7. Here, the efficiency of the fuel cell system is associated with outputting the same amount of power using less fuel. As described above, the threshold value may be set to allow the fully charged battery 6, and only the battery 6, after being fully charged to supply power to the load 7, thus reducing frequent start-ups and shut-downs of the fuel cell 1, as well as frequent charge/discharge cycles of the battery 6 because the battery 6 is always fully charged and then discharged. The frequent start-ups and shut-downs of the fuel cell 1 may interfere with ensuring time to optimize states within the fuel cell 1, such as a temperature and the like, and time to retrieve water inside the fuel cell 1. The fuel cell system of FIG. 1 may avoid this by reducing the number of start-ups and shut-downs of the fuel cell 1. In addition, instability of the start-up of the fuel cell system, caused by lack of battery capacity, may also be prevented.

When the difference between the target current value and the output current value of the fuel cell 1 is greater than the threshold value for a predetermined period of time, the controller 3 may stop the operation of the BOP 2 in order to stop the power production of the fuel cell 1. In such a manner, the controller 3 allows only the power of the battery 6 to be supplied to the load 7 by stopping the operation of the BOP 2. In a case where the power consumption of the load 7 momentarily decreases and thus the difference between the target current value and the output current value of the fuel cell 1 temporarily becomes greater than the threshold value, the predetermined period of time serves to prevent the battery 6 from being misjudged as being fully charged. Therefore, the predetermined period of time may be set to be sufficiently long considering a degree of change in the power consumption of the load 7. However, if the predetermined period of time is set to be very long relative to the degree of change in the power consumption of the load 7, the number of battery discharges may be unnecessarily reduced, thus lowering the efficiency of the fuel cell system.

When the operation of the BOP 2 is stopped, the battery 6 may only be discharged, without being charged, because there is no output power from the fuel cell 1. When the battery 6 is completely discharged, power supply to the load 7 is cut off. Thus, if a total discharged power quantity of the battery 6 is equal to or greater than a reference power consumption quantity while the battery 6 is being discharged, the controller 3 starts up the fuel cell 1 to resume the power production of the fuel cell 1. Also, when the operation of the BOP 2 is stopped, power being consumed inside the fuel cell system, as well as power being consumed by the load 7, is provided from the charged power of the battery 6 because there is no output power from the fuel cell 1. For example, when the fuel cell 1 is started up, power consumed by the BOP 2 is provided from the charged power of the battery 6 because there is no output power from the fuel cell 1. Also, even in a case where air depletion is performed on a regular basis in order to maintain performance and durability of the fuel cell 1, power consumed by the BOP 2 is provided from the charged power of the battery 6 because there is no output power from the fuel cell 1. Accordingly, the reference power consumption quantity is determined in due consideration of power consumed by the BOP 2 at a stage of a start-up of the fuel cell 1 and the total discharged power quantity of the battery 6 until the started fuel cell 1 satisfies power consumption of both the load 7 and the BOP 2.

Meanwhile, in a case where a device corresponding to the load 7 connected to the fuel cell system illustrated in FIG. 1 is changed, for example, in a case where a device is changed from a mobile phone to a notebook computer, power consumption of the load 7 is changed, and thus the threshold value is also changed. Meanwhile, if the load 7 is frequently changed to various types of devices and connected to the fuel cell system, a method in which a current detector (not shown) is mounted on a side of the battery 6 to detect whether there is a current being input to the battery 6 may be considered. According to this method, when a current input to the battery 6 is not detected for a predetermined period of time by the current detector of the battery 6, the controller 3 stops the operation of the BOP 2. A current input to the battery 6 is not detected for a predetermined period of time when the battery 6 is fully charged.

Figure 2:
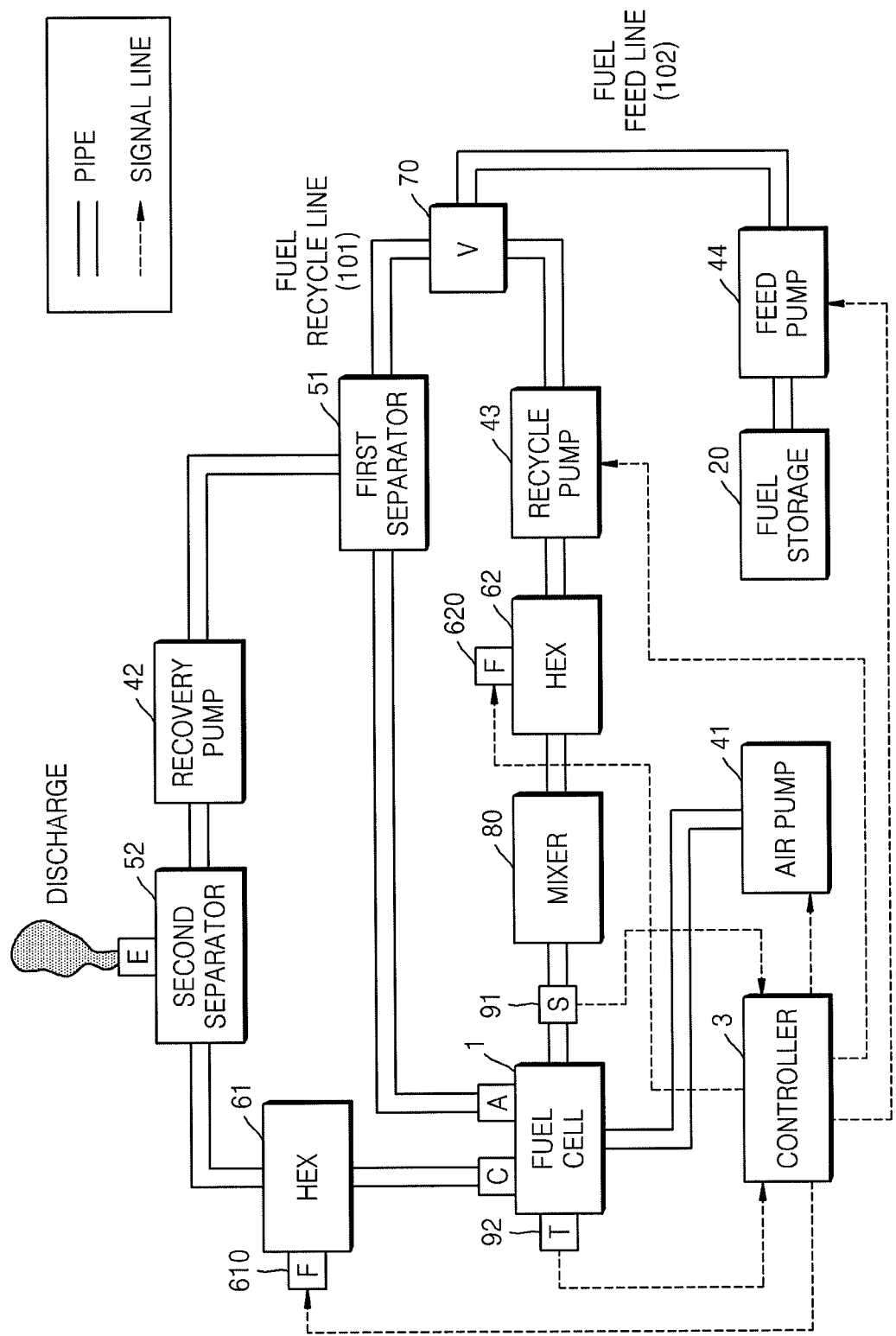
FIG. 2 illustrates a detailed block diagram of a Balance of Plant (BOP) illustrated in FIG. 1.

FIG. 2 illustrates a detailed block diagram of the BOP 2 illustrated in FIG. 1.

Referring to FIG. 2, the BOP 2 illustrated in FIG. 1 includes a fuel storage 20, an air pump 41, a water recovery pump 42, a recycle pump 43, a feed pump 44, a first separator 51, a second separator 52, a first heat exchanger (HEX) 61, a second heat exchanger 62, a valve module (V) 70, a mixer 80, and multiple sensors and fans. As described above, BOP refers to peripheral devices of the fuel cell 1 for supplying fuel, water, air, and the like to the fuel cell 1. As illustrated in FIG. 2, various pipes connecting the constituents of the BOP 2 are installed between the constituents. Examples of the sensors provided in the BOP 2 may include a fuel concentration sensor (S) 91 positioned at a pipe between the fuel cell 1 and the mixer 80, and a thermistor (T) 92 positioned on a surface of the fuel cell 1. Furthermore, examples of the fans provided in the BOP 2 may include fans (F) 610 and 620 respectively mounted on the first heat exchanger 61 and the second heat exchanger 62. A fuel recycle line 101 and a fuel feed line 102 may also be provided.

The fuel concentration sensor 91 provided in the BOP 2 illustrated in FIG. 2 may be a multi-functional sensor having a fuel temperature detection function as well as a fuel concentration detection function. The fuel concentration sensor 91 positioned at a side of a pipe between the fuel cell 1 and the mixer 80 may be substituted with a fuel concentration sensor for detecting only a concentration of fuel, and a thermistor detecting a temperature of the fuel, namely, two sensors. Also, the thermistor may be substituted with another type of temperature measuring device such as a thermocouple. Also, in the fuel cell system illustrated in FIG. 1, devices other than the constituents shown in FIG. 1 may exist. For example, a filter or the like may be added to the fuel cell system depicted in FIG. 1, in order to remove impurities of fuel flowing in a pipe connected to the fuel concentration sensor 81 or the like. In particular, an example embodiment of FIG. 2 relates to a BOP for operating a direct methanol fuel cell, but techniques described in the following description may be applied to other types of fuel cells.

Unlike an indirect methanol fuel cell that reforms methanol to increase a hydrogen concentration, the fuel cell 1 is a direct methanol fuel cell that generates hydrogen ions and electrons as methanol and water directly react to each other at an anode of the fuel cell 1 without reforming methanol. Since the direct methanol fuel cell does not require a process of reforming methanol, it is suitably applied to a portable fuel cell system.

In the anode of the fuel cell 1, a reaction of $CH_3OH+H_2O \rightarrow 6H^+ +6e^- +CO_2$ occurs, while a reaction of $3/2O_2+6H^+ +6e^- \rightarrow 3H_2O$ occurs in a cathode of the fuel cell 1. Protons ($H^+$) are transmitted through a proton exchange membrane inside the fuel cell 1, and electrons ($e^-$) are transmitted through an external circuit from the anode to the cathode. Through this process, power is produced. The direct methanol fuel cell may include a catalyst for a smooth reaction in the fuel cell 1. The catalyst is generally formed of platinum, and may be degraded if a temperature of the reaction process is excessively high. Accordingly, pure methanol may not supplied to the fuel cell 1, and methanol diluted with an appropriate amount of water, that is, an aqueous methanol solution having an appropriate concentration, may be supplied to the fuel cell 1. Hereinafter, the aqueous methanol solution being supplied to the anode of the fuel cell 1 is simply referred to as fuel.

As described above, appropriate amounts of methanol ($CH_3OH$), water ($H_2O$), and air ($O_2$) may be supplied to the fuel cell 1 in order for a reaction to occur in the fuel cell 1 smooth while preventing the deterioration of the fuel cell 1. The controller 3 may control the air pump 41, the feed pump 44, the recycle pump 43, and the recovery pump 42 to control the amounts of fuel, water, and air being supplied to the fuel cell 1. The fuel cell 1 produces power by using fuel of an appropriate concentration supplied from the mixer 80 to the anode of the air pump 41. In a power production process of the fuel cell 1, carbon dioxide, unreacted fuel, and the like, as byproducts of the reaction process, are discharged from the anode of the fuel cell 1, and water and the like, as byproducts of the reaction process, are discharged from the cathode of the fuel cell 10.

The first separator 51 retrieves methanol and water by separating methanol and water from the byproducts, unreacted fuel, and the like, discharged from the anode (A) of the fuel cell 1. The byproducts discharged from the cathode (C) of the fuel cell 1 are high-temperature fluids containing vaporized moisture due to reaction heat in the fuel cell 1. This passes through the first heat exchanger 61 to be cooled by a heat exchange process in the first heat exchanger 61, and a portion of water is retrieved in this process. The second separator 52 retrieves water by separating water from the cooled byproducts, and discharges carbon dioxide and the like, which are byproducts remaining after the retrieving process, outside of the fuel cell system. The first separator 51 and the second separator 52 may separate methanol and water from the byproducts and unreacted fuel, discharged from the fuel cell 1, by using centrifugation or the like. The recovery pump 42 takes in water retrieved by the second separator 52 and discharges it to the first separator 51. Accordingly, low-concentration fuel, a mixture of the methanol retrieved by the first separator 51 and water retrieved by the first separator 51 and the second separator 52, is discharged from the first separator 51.

The fuel storage 20 is a container that stores fuel, and may be manufactured in various shapes such as cylindrical shape, box shape, and so on. The fuel storage 20 may be manufactured in a form allowing for fuel refill. Also, the fuel storage 20 may be manufactured to be detachably mounted on the fuel cell system, and may be referred to as a cartridge. In the fuel storage 20, high-concentration fuel, for example, 100-percent methanol, is stored.

The valve module 70 is inserted into a point at which the fuel recycle line 101 and the fuel feed line 102 meet, and controls a flow of low-concentration fuel recycled from the fuel cell 1 to the fuel cell 1 through the fuel recycle line 101, and a flow of high-concentration fuel supplied to the fuel cell 1 from the fuel storage 20 through the fuel feed line 102. Here, the fuel recycle line 101 represents pipes placed in a path through which unreacted fuel discharged from the fuel cell 1 flows back to the fuel cell 1, and the fuel feed line 102 represents pipes placed in a path through which newly provided fuel flows from the fuel storage 20 to the fuel cell 1.

The recycle pump 43 takes in at least one of the low-concentration fuel delivered through the fuel recycle line 101 from the valve module 70, and the high-concentration fuel delivered through the fuel feed line 102 according to fuel flow control of the valve module 70, and discharges it to the mixer 80 through the second heat exchanger 62. The fuel discharged from the recycle pump 43 passes through the second heat exchanger 62 to have its temperature be controlled by a heat exchange operation of the second heat exchanger 62. The mixer 80 mixes the high-concentration fuel and the low-concentration fuel discharged from the recycle pump 43, and an appropriate concentration of fuel generated through the mixing process is supplied to the fuel cell 1.

The first heat exchanger 61 is positioned in a specific point of a pipe line in which water is discharged from the fuel cell 1, for example, in an outlet of a cathode side of the fuel cell 1, and thus controls a temperature of water discharged from the cathode of the fuel cell 1. The second heat exchanger 62 is positioned in a specific point of a pipe line in which fuel supplied to the fuel cell 1 flows, for example, between the recycle pump 43 and the mixer 80, and thus controls a temperature of fuel supplied to the anode of the fuel cell 1. The first heat exchanger 61 and the second heat exchanger 62 may each be implemented as a metal pipe, a tank, or the like so as to achieve smooth heat exchange between fluids flowing in the pipes of the fuel cell system and a medium outside the pipes.

In particular, the first heat exchanger 61 retrieves heat of water discharged from the cathode of the fuel cell 1, thus lowering the temperature of water being discharged from the cathode of the fuel cell 1. Like the first heat exchanger 61, the second heat exchanger 62 lowers the temperature of fuel supplied to the anode of the fuel cell 1. Also, the second heat exchanger 62 may increase the temperature of the fuel supplied to the anode of the fuel cell 1 by using the heat retrieved by the first heat exchanger 61. In this case, the second heat exchanger 62 may be implemented as a metal pipe, a tank, or the like, integrated with the first heat exchanger 61, so as to receive the heat retrieved by the first heat exchanger 61. Also, the first heat exchanger 61 and the second heat exchanger 62 may be respectively provided with the fans 610 and 620 to rapidly cool fluids flowing in the pipes of the fuel cell system. As for these fans 610 and 620, the fan 610 may be installed on a housing of a fuel system adjacent to the first heat exchanger 61 for smooth heat exchange between the first heat exchanger 61 inside the fuel system and air existing outside the fuel cell system. Likewise, the fan 620 may be installed on a housing of the fuel system adjacent to the second heat exchanger 62.

As described above, the BOP 2 depicted in FIG. 2 retrieves water discharged from the fuel cell 1 by using the first separator 51, the second separator 52, and the like and thus reuses the water, thus allowing the fuel cell 1 to be continuously driven without water supply from outside the fuel cell system.

In a case where the environment of the fuel cell system changes, for example, in a case where an external temperature, an external humidity, and the like of the fuel cell system undergo changes, the temperature of the fuel cell 1 itself, a temperature of fuel supplied to the fuel cell 1, an amount of water inside the fuel cell system, and the like may be changed. This may interfere with maintaining an appropriate concentration and temperature required for an optimal reaction of fuel within the fuel cell 1, thus causing limitations in durability and power production of the fuel cell 1. Particularly, in a case where high-concentration fuel is supplied to the fuel cell 1 for a long time, fuel efficiency may be degraded, and the durability of the fuel cell 1 may be impaired due to continuous heating of the fuel cell 1.

The controller 3 shown in FIG. 2 may obtain information regarding a current external environment of the fuel cell system, e.g., from one or more sensors mounted on the fuel cell system. The information regarding the current external environment of the fuel cell system may include, e.g., an external temperature of the fuel cell system (e.g., an ambient temperature), an external humidity of the fuel cell system (e.g., an ambient humidity), etc.

Also, the controller 3 may determine a target value of factors determining reaction conditions of the fuel in the fuel cell 1, the target value varying corresponding to the information obtained from the sensors. The factors that determine the reaction conditions of the fuel in the fuel cell 1 may include, e.g., a temperature of the fuel cell 1 itself, a temperature of the fuel supplied to the fuel cell 1, an amount of water retrieved from the fuel cell 1, and the like. The determination of the target value of a factor may be based on a correspondence relationship of a change of the factor with respect to a change in the external environment of the fuel cell system.

Also, the controller 3 may control the peripheral devices of the fuel cell 1 affecting the reaction conditions of the fuel in the fuel cell 1 according to the target value of each of the factors.

As described above, the controller 3 does not control the peripheral devices of the fuel cell 1 according to some fixed values stored in the form of a table, but controls the peripheral devices of the fuel cell 1 based on the continuous correspondence relationship described above. Accordingly, even if the external environment rapidly changes or becomes an unexpected extreme environment, the fuel cell 1 may normally operate. This may improve durability of the fuel cell 1 and enable stable power production by the fuel cell 1.

By way of comparison, controlling peripheral devices based on fixed stored values set in 1-degree intervals from −5 degrees to 45 degrees with respect to an external temperature of the fuel cell system, does not provide for control of the peripheral devices under the extreme environment of −20 degrees or 50 degrees. Further, the peripheral devices may not be precisely controlled with respect to temperatures in 0.5-degree intervals. In contrast, the controller 3 shown in FIG. 2 may control the peripheral devices of the fuel cell 1 based on the continuous correspondence relationship as described above, such that the peripheral devices of the fuel cell may be controlled under the extreme environment of −20 degrees or 50 degrees, and the peripheral devices of the fuel cell may be precisely controlled with respect to temperatures in 0.5-degree intervals. Since the target value of each of the factors, varying corresponding to the information obtained by the sensors, is determined based on the continuous correspondence relation, the target value may normally be a continuously varying value (in other implementations, it may be a discontinuous varying value according to a control method of the peripheral devices of the fuel cell system, or the like).

Figure 3:
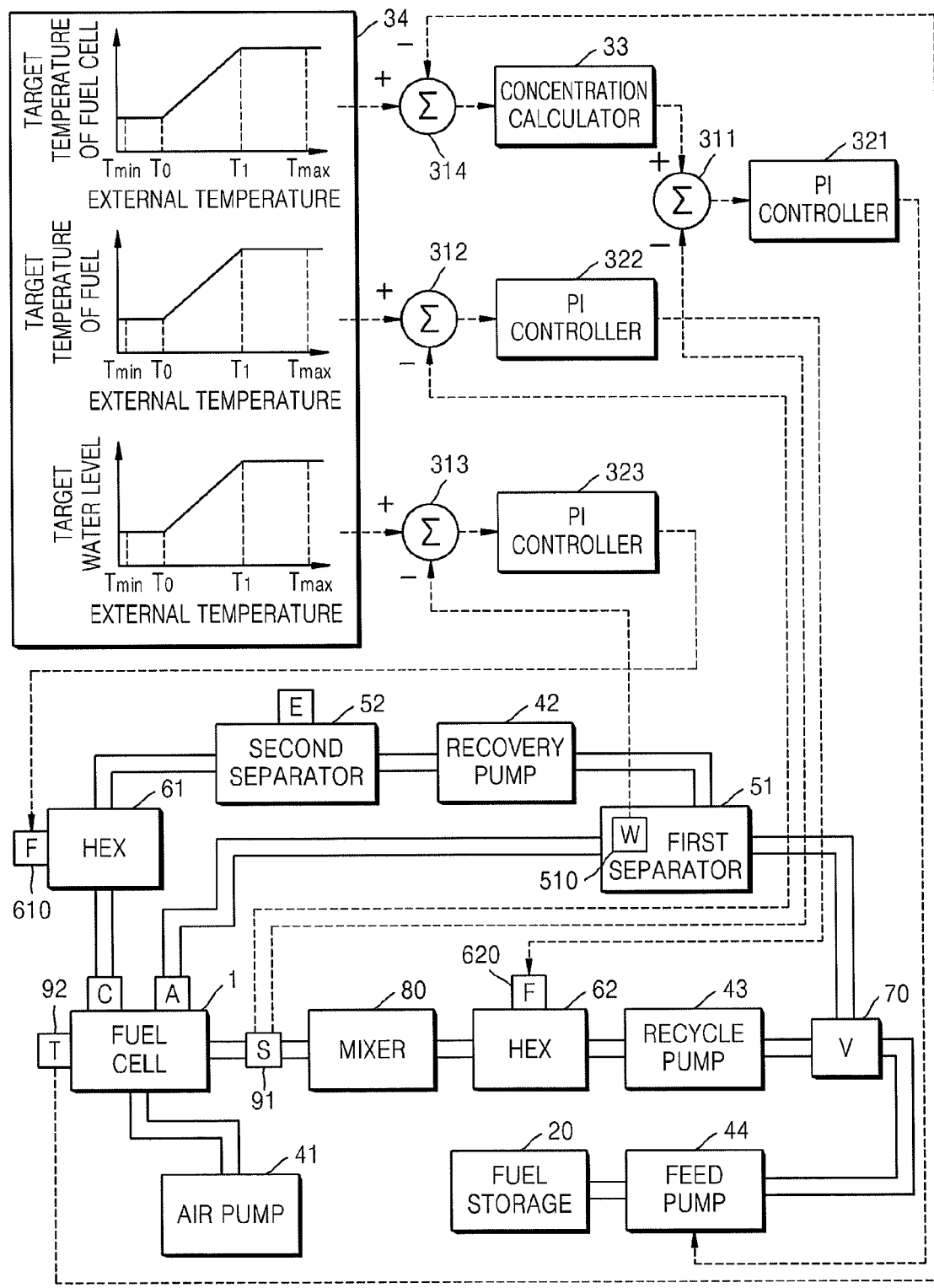
FIG. 3 illustrates a block diagram of a device for controlling reaction conditions of fuel in a controller illustrated in FIG. 2.

FIG. 3 illustrates a block diagram of a device for controlling reaction conditions of fuel in the controller 3 illustrated in FIG. 2.

In FIG. 3, only constituents for performing a function of controlling the reaction conditions of the fuel in the controller 3 are illustrated for the sake of brevity. In other words, the controller 3 may further include one or more other constituents for performing a different function than the constituents illustrated in FIG. 3. For example, the controller 3 may include constituents for controlling the air pump 41. With reference to FIG. 3, a fuel state control device in the controller 3 includes four adders 311, 312, 313, and 314, three proportional-integral (PI) controllers 321, 322, and 323, a fuel concentration calculator 33, and a memory 34.

Each of the PI controllers 321, 322, and 323 controls a controlled object such that a current output value of the controlled object follows a target value by using a proportional control and an integral control with respect to a difference (i.e., an error) between a set point corresponding to a predetermined target value and a current output value of the controlled object. Among the adders 311, 312, 313, and 314, the adders 311, 312, and 313 positioned at a front stage of the PI controllers 321, 322, and 323 calculate the difference between the set value and the output value of the controlled object, and the calculated difference is input to the PI controllers 321, 322, and 323. In general, the adders 311, 312, and 313 are also regarded as part of PI controlling.

In the example embodiment illustrated in FIG. 3, set values respectively applied to the PI controllers 321, 322, and 323 are values of factors determining reaction conditions of fuel in the fuel cell 1 to optimize the reaction conditions of the fuel in the fuel cell 1 in due consideration of a current external environment of the fuel cell system such as a current external temperature, a current external humidity, or the like of the fuel cell system. The current external environment, for example, the current external temperature, of the fuel cell system may be measured by a temperature sensor (not shown) mounted in front of the fan 610 attached to the first heat-exchanger 61 or the fan 620 attached to the second heat-exchanger 62. As described above, the factors determining the reaction conditions of the fuel in the fuel cell 1 may include, for example, the temperature of the fuel cell 1 itself, the temperature of the fuel supplied to the fuel cell 1, the amount of water retrieved from the fuel cell 1, and the like. Thus, the controlled objects are peripheral devices of the fuel cell 1 affecting the reaction conditions of the fuel. Meanwhile, those skilled in the art to which the present example embodiment pertains could easily understand that other factors determining the reaction conditions of the fuel than the foregoing factors may be easily applicable to the present example embodiment.

The peripheral devices of the fuel cell 1 may be simultaneously controlled by the PI controllers 321, 322, and 323, the temperature of the fuel cell 1 itself. Thus, the temperature of the fuel supplied to the fuel cell 1, and the amount of water retrieved from the fuel cell 1 may be simultaneously controlled. Accordingly, limitations when only any one or two of the temperature of the fuel cell 1 itself, the temperature of the fuel supplied to the fuel cell 1, and the amount of water retrieved from the fuel cell 1 is or are controlled may be overcome. By comparison, when peripheral devices are controlled such that a fuel concentration and temperature of the fuel follow fixed values, if the amount of water retrieved from the fuel cell is insufficient, the fuel cell system may be stopped. Meanwhile, the temperature of the fuel cell 1 may be measured in various manners: namely, it may be measured as a temperature of a surface of the fuel cell 1, a temperature of an interior of the fuel cell 1, or the like. In general, it is easier to measure the surface of the fuel cell 1 than to measure the interior of the fuel cell 1. Hereinafter, example embodiments designed by specifying the temperature of the fuel cell 1 as the temperature of the surface of the fuel cell 1 will be described. However, those skilled in the art to which the present example embodiments pertain could understand that the temperature of the fuel cell 1 may be measured according to any other method than the method to be described.

Data representing a correspondence relationship of a change in each of the factors determining the reaction conditions of the fuel in the fuel cell 1 to a change in an external environment of the fuel cell system is stored in the form of a function. Thus, since the correspondence relationship of a change in each of the factors determining the reaction conditions of the fuel in the fuel cell 1 to a change in an external environment of the fuel cell system is represented as a function, the reaction conditions of the fuel may be controlled by continuous values of a broad range instead of by some fixed values. For example, when an x value is an external temperature of the fuel cell system and a y value is any one of the factors determining the reaction conditions of the fuel in the fuel cell 1, the foregoing correspondence relationship may be expressed in the form of a function of the x value, an independent variable, distributed in a temperature section limited between the lowest temperature Tmin and the highest temperature Tmin and a y value, a dependent variable, which changes as the x value changes. Thus, values may be computed, rather than being looked up.

Functions include a linear function and a nonlinear function. A linear function refers to a function, i.e., the primary function, whose dependent variable changes linearly over an independent variable. A nonlinear function refers to a function other than the primary function, whose dependent variable changes nonlinearly over an independent variable. Meanwhile, a constant function refers to a function whose dependent variable has a constant value regardless of an independent variable. A coefficient of the independent variable of the constant function is 0 in the primary function, and thus the constant function is defined included in the primary function. The correspondence relationship may be expressed by a single function or several functions in the overall temperature section between the lowest temperature Tmin and the highest temperature Tmax according to operational characteristics or the like of the fuel cell 1. When the correspondence relationship is expressed by several functions, the correspondence relationship in the overall temperature section may not be expressed by a single linear function, it may be a nonlinear correspondence relationship.

Figure 5:
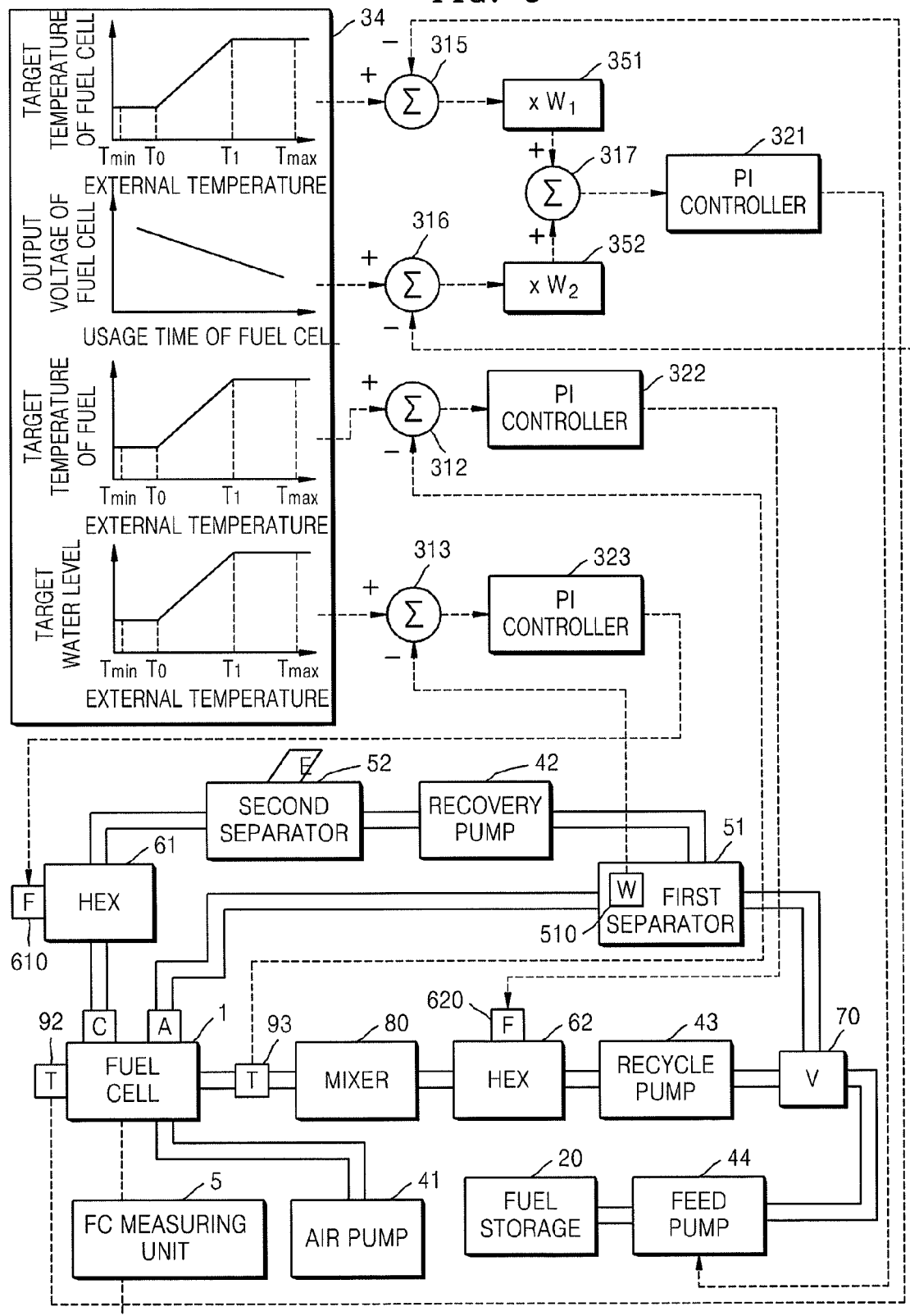
FIG. 5 illustrates a block diagram of another example of a device for controlling reaction conditions of fuel in the controller illustrated in FIG. 2.

For example, as shown in FIGS. 3 and 5, when a section between the lowest temperature Tmin and a first boundary temperature T0 is a first sub-section, a section between the first boundary temperature T0 and a second boundary temperature T1 is a second sub-section, and a section between the second boundary temperature T1 and the highest temperature Tmax is a third sub-section, the correspondence relationship may be expressed by a first function f1 in the first sub-section, a second function f2 in the second sub-section, and a third function f3 in the third sub-section. The functions may be defined by Equation 1 shown below. Equation 1 is merely illustrative and the functions may be defined by a different equation. For example, a constant term may be added to Equation 1, or a term of a different degree may be added to Equation 1. In Equation 1, i indicates a function of a predetermined sub-section of the overall temperature section, and has a value of any one of 1, 2, and 3. j and k have a value ranging from 0 to 5 and are determined according to the operational characteristics of the fuel cell 1. The foregoing range of 0 to 5 is merely illustrative and j and k may have a different range.

$$f_i = C_j \cdot (T)^k \qquad \text{Equation 1}$$

When the correspondence relationship is expressed by a single linear function in the overall temperature section between the lowest temperature Tmin and the highest temperature Tmax, the value j will be uniform and k will be 1 or smaller in the overall temperature section. When the correspondence relationship is expressed by three linear functions in the three sub-sections, the first function f1, the second function f2, and the third function f3 may each have a different j value and k may be 2 or greater.

When a portion of the correspondence relationship is expressed by a linear function and another portion of the correspondence relationship is expressed by a nonlinear function in the three sub-sections, the first function f1, the second function f2, and the third function f3 may each have a different j value and k may be 1 or smaller or 2 or greater. In the examples illustrated in FIGS. 3 and 5, the first function f1 and the third function f3 are constant functions having k as 0 and different coefficient values Cj, and the second function f2 is a linear function having k as 1. In this case, Cj of the second function f2 corresponds to the slope of a straight line illustrated in the second sub-section. Meanwhile, if a nonlinear line, such as a curved line, or the like, rather than the straight line, is illustrated in the second sub-section, the second function f2 is a nonlinear function having k as 2 or greater.

The fuel cell system is put into a chamber having an environment obtained by modeling an external environment of the fuel cell system, and, while changing the environment of the chamber, optimum values of the factors determining the reaction of the fuel in the fuel cell 1 in various environments are searched for. Functions representing the correspondence relationship between the determined optimum values and the change in the external environment are used to obtain data denoting the correspondence relationship between the change in the external environment of the fuel cell system and the change in the factors determining the reaction of the fuel in the fuel cell 1. Namely, data stored in the memory 34 may be empirical data. For example, when only an external temperature is considered as the external environment factor of the fuel cell system, optimal values of the factors determining the reaction of the fuel in the fuel cell 1 are sought at every interval of 5° C., while changing the temperature of the chamber with the fuel cell system installed therein from −40° C. to 55° C., and a function representing the correspondence relationship between the optimal values and the change in the external environment is determined from the determined optimal values.

In this manner, the data denoting the correspondence relationship of the change in the temperature of the fuel cell 1 itself to the change in the external temperature of the fuel cell system, data denoting the correspondence relationship of the change in the temperature of the fuel supplied to the fuel cell 1 to the change in the external temperature of the fuel cell system, and data denoting the correspondence relationship of the change in the amount of water retrieved from the fuel cell 1 to the change in the external temperature of the fuel cell system are stored in the memory 34 of the fuel cell system which considers only the external temperature as the eternal environment factor of the fuel cell system. Meanwhile, when the memory 34 of the fuel cell system considers only an external humidity as an external environment factor of the fuel cell system, the memory 340 stores data denoting the correspondence relationship of the change in the factors determining the reaction of the fuel in the fuel cell 1 to the change in the external humidity of the fuel cell system. Also, when the memory 34 of the fuel cell system considers both the external temperature and humidity as external environment factors of the fuel cell system, the memory 340 stores data denoting the correspondence relationship of the change in the factors determining the reaction of the fuel in the fuel cell 1 to the change in the external temperature and external humidity of the fuel cell system.

A change in humidity according to the change in temperature varies according to areas of the world. For example, there is an area humid at a high temperature and dry at a low temperature and an area dry at a high temperature and humid at a low temperature. The data denoting the correspondence relationship between the change in the external environment of the fuel cell system and the change in the factors determining the reaction of the fuel in the fuel cell 1 may be obtained through an experiment in a chamber configured by modeling a particular area. In this case, a change in a temperature in a particular area includes a change in humidity, so the data obtained through the experiment in the chamber configured by modeling the particular area may denote the correspondence relationship of the change in the factors determining the reaction of the fuel in the fuel cell 1 to the change in the external humidity by using only the correspondence relationship of the change in the factors determining the reaction of the fuel in the fuel cell 1 to the change in the external temperature of the fuel cell system. As for the data stored in the memory 34 illustrated in FIG. 2, only the change in the external temperature of the fuel cell system is shown on an x axis, but it may also involve a change in external moisture. For example, it may be considered that the external humidity is low when the external temperature is low, and high when the external temperature is high. Thus, the fuel cell system storing the data obtained in consideration of the characteristics of the particular area may exhibit an optimum performance when the fuel cell system is in used in the corresponding area.

Figure 4:
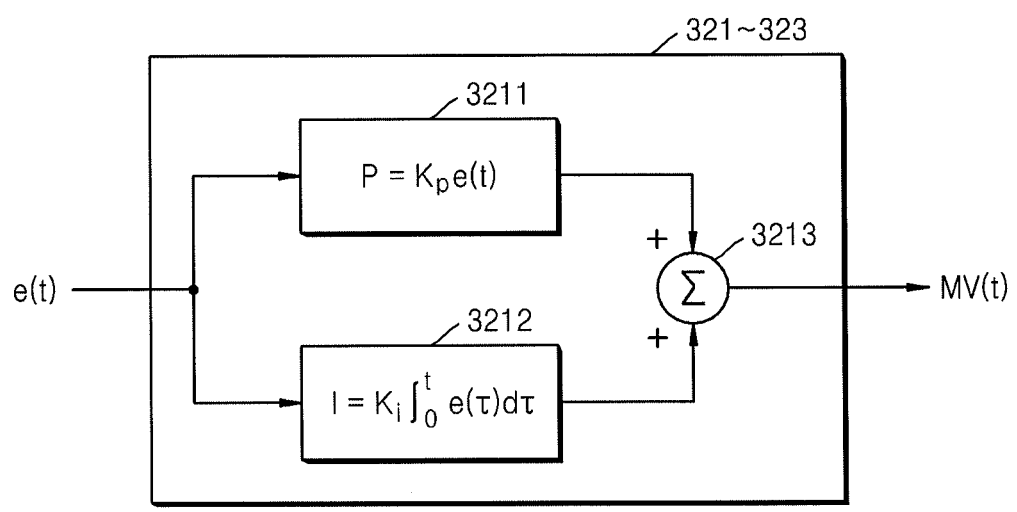
FIG. 4 illustrates an internal block diagram of each of proportion-integral (PI) controllers illustrated in FIG. 3.

FIG. 4 illustrates an internal block diagram of each of the PI controllers 321, 322, and 323 illustrated in FIG. 3.

With reference to FIGS. 2 to 4, the PI controllers 321, 322, and 323 illustrated in FIG. 3 include a P controller 3211, an I controller 3212, and an adder 3213, respectively. The P controller 3211 multiplies an appropriate proportional gain $K_p$ with a difference (i.e., an error) e(t) between a set value and the current output value of the controlled object to generate a control signal P for reducing the difference between the set value and the output value. The I controller 3212 integrates the error e(t) between the set value and the output value and multiplies an appropriate integral gain $K_i$ with the integrated difference to generate a control signal I for reducing a remaining offset generated from the P controller 3211. The adder 3213 adds the control signal P generated by the P controller 3211 and the control signal I generated by the I controller 3212 to generate a control signal MV(t) for making the output value of the controlled object flexibly close to the set value. Namely, each of the PI controllers 321, 322, and 323 generates the control signal MV(t) according to Equation 2 shown below. The proportional gain $K_p$ and the integral gain $K_i$ may be determined through an experiment, or the like.

$$MV(t)=K_p e(t)+K_i \int_0^t e(\tau)d\tau \qquad \text{Equation 2}$$

The error e(t) input to each of the PI controllers 321, 322, and 323 refers to an difference at a current time t, and the MV(t) output from each of the PI controller 321, 322, and 323 refers to a manipulated variable of the controlled object at the current time t. The process in which each of the PI controllers 321, 322, and 323 calculates MV(t1) from an error e(t1) at a time t1, generates a new error e(t2) at a time t2 from an output value fed back from the controlled object by the manipulated variable MV(t1), and calculates a new manipulated variable MV(t) of the controlled object from the new error e(t2) is continuously circulated to make the output value of the controlled object gradually close to the set value, and this is a type of control loop feedback mechanism.

In particular, since the set values of the PI controller 321, 322, and 323 are determined by the functions stored in the memory 34, a set value corresponding to a target value in the current external environment of the fuel cell system changes in real time according to the change in the external environment of the fuel cell system. The PI controller 321, 322, and 323 control the controlled object such that the set values changing in real time follows new set values through the circulation of the foregoing process. The control loop feedback mechanism includes P controlling without such an integral control part as in PI controlling, PID controlling including D controlling for generating a control signal D for reducing overshoot generated from the P controlling part by differentiating the error e(t) between the set value and the output value and multiplying an appropriate integral gain $K_d$ to the differentiated error, and the like. Those skilled in the art to which the present example embodiment pertains could understand that the P controlling or PID controlling may be used in the place of the PI controlling.

With reference to FIG. 3, the fourth adder 314 receives a target temperature of the surface of the fuel cell 1 at a current external temperature of the fuel cell system from the memory 34 and a current temperature of the surface of the fuel cell 1 from the thermistor 92 positioned on the surface of the fuel cell 1, and calculates a difference between the two values. The fuel concentration calculator 33 calculates a target concentration of the fuel to be supplied to the fuel cell 1 at the current external temperature of the fuel cell system from the difference value calculated by the fourth adder 314. For example, the fuel concentration calculator 33 may calculate the target concentration of the fuel to be supplied to the fuel cell 1 at the current external temperature of the fuel cell system from the difference between the target temperature of the surface of the fuel cell 1 and the current temperature by using Equation 3 shown below:

$$C(t) = C_i + K_2\left(K_1 e(t) + \frac{e(t) - e(t')}{t - t'}\right) \quad \text{Equation 3}$$

In Equation 3, Ci is an initial concentration of the fuel at a point in time when the fuel cell system starts to operate, which provides a reference in determining a target fuel concentration, $k_1$ and $k_2$ are proportional constants, e(t) is the difference between the target temperature of the surface of the fuel cell 1 and the current temperature at the current time t, and e(t') is the difference between the target temperature of the surface of the fuel cell 1 and the current temperature at a previous time t'. When the concentration of the fuel supplied to the fuel cell 1 becomes high, the temperature of the surface of the fuel cell 1 increases, and when the concentration of the fuel supplied to the fuel cell 1 becomes low, the temperature of the surface of the fuel cell 1 decreases. Thus, the difference between the target temperature of the surface of the fuel cell 1 and the current temperature is proportional to a correction value of a current concentration of the fuel to reach the target temperature. The target concentration of the fuel allowing the surface temperature of the fuel cell 1 to reach the target value may be calculated by adding a value obtained by multiplying an appropriate proportional constant to the difference between the target temperature of the surface of the fuel cell 1 and the current temperature, to an initial concentration of the fuel. Here, the proportional constant may be determined through an experiment, or the like. The fuel cell 1 may have a low responsiveness to the fuel concentration and temperature of the fuel. Thus, fuel having a high concentration may be supplied to the fuel cell 1 in order to rapidly increase the temperature of the surface of the fuel cell 1 within a short time. The last term in Equation 3 is a correction value in consideration of such responsiveness.

The first adder 311 receives the target concentration of the fuel at the current external temperature of the fuel cell system from the fuel concentration calculator 33 and receives a current concentration of the fuel from the fuel concentration sensor 91 positioned at a part where the fuel supplied to the fuel cell 1 flows, e.g., at the pipe between the fuel cell 1 and the mixer 80, and calculates a difference between the values. The first PI controller 321 controls a peripheral device of the fuel cell 1, e.g., the supply pump 44 for supplying the fuel to the fuel cell 1, which affects the concentration of the fuel supplied to the fuel cell 1 by using the difference value calculated by the first adder 311 to make the current concentration of the fuel supplied to the fuel cell 1 follow the target concentration of the fuel at the current external temperature of the fuel cell system. For example, when the target concentration of the fuel is higher than the current fuel concentration, the first PI controller 321 increases the pumping amount of the fuel of the supply pump 44 in order to increase the concentration of the fuel. In the opposite case, the first PI controller 321 controls the supply pump 44 in an opposite manner.

As described above, in the example embodiment illustrated in FIG. 3, rather than immediately controlling the supply pump 44 by using the difference between the target temperature of the surface of the fuel cell 1 at the current external temperature of the fuel cell system and the current temperature, the target concentration of the fuel to be supplied to the fuel cell 1 at the current external temperature of the fuel cell system is calculated from the difference between the target temperature of the surface of the fuel cell 1 and the current temperature. The supply pump 44 is then controlled by using the calculated target fuel concentration, thus making the current temperature of the fuel cell 1 follow the target temperature of the surface of the fuel cell 1. This considers the fact that the change in the temperature of the surface of the fuel cell 1 according to the change in the concentration of the fuel supplied to the fuel cell 1 appears late due to a low responsiveness of the fuel cell 1. Since effects of the change in the concentration of the fuel on the temperature of the surface of the fuel cell 1 may occur very slowly, it may be more effective to control the current concentration of the fuel detected by the fuel concentration sensor 91 to follow the target fuel concentration indirectly in order to control the supply of the fuel to the fuel cell 1 having the characteristics of very long delay time. Thus, controlling the immediate measurement value of the fuel concentration sensor 91 to follow the target fuel concentration may allow for more precise temperature controlling and fuel concentration controlling without a fluctuation, and in this case, the temperature and fuel concentration controlling may be advantageously performed rapidly.

The second adder 312 receives the target temperature of the fuel cell 1 at the current external temperature of the fuel cell system from the memory 34 and receives the current temperature of the fuel from the fuel concentration sensor 91 positioned at the part where the fuel supplied to the fuel cell 1 flows, e.g., at the pipe between the fuel cell 1 and the mixer 80, and calculates the difference between the values. The second PI controller 322 controls a peripheral device of the fuel cell 1, e.g., at least one of the second heat-exchanger 62 positioned at the pipe along which the fuel supplied to the fuel cell 1 flows and the fan 620 attached to the second heat-exchanger 62, which affects the temperature of the fuel supplied to the fuel cell 1, by using the difference value calculated by the second adder 312 to make the current temperature of the fuel supplied to the fuel cell 1 follow the target temperature at the current external temperature of the fuel cell system. For example, when the target temperature of the fuel is higher than the current temperature, the first PI controller 321 decreases the speed of the fan 620 attached to the second heat-exchanger 62 or stops the fan 620. Also, the first PI controller 321 may rapidly increase the temperature of the fuel by using heat previously retrieved through the first heat-exchanger 61 or the second heat-exchanger 62. In the opposite case, the second PI controller controls the second heat-exchanger 62 and the fan 620 attached to the second heat-exchanger 62 in an opposite manner.

The third adder 313 receives a target water level at the current external temperature of the fuel cell system from the memory 34, receives a current water level of water retrieved from the fuel cell 1 from a part where the water retrieved from the fuel cell 1 joins (e.g., a water level sensor 510 mounted in the first separator 51), and calculates a difference between the values. The third PI controller 323 controls a peripheral device of the fuel cell 1 (e.g., at least one of the first heat-exchanger 61 positioned at the pipe where the water retrieved from the fuel cell 1 flows and the fan 610 attached to the first heat-exchanger 61), which affects the water level of the water retrieved from the fuel cell 1, by using the difference value calculated by the third adder 313 in order to make the current water level of the water retrieved from the fuel cell 1 follow the target water level at the current external temperature of the fuel cell system. For example, when the target water level of the water is higher than the current water level, the first PI controller 321 increases the speed of the fan 610 attached to the first heat-exchanger 61 in order to increase the amount of the water retrieved from the fuel cell 1. When the speed of the fan 610 attached to the first heat-exchanger 61 increases, a larger amount of vapor in by-products discharged from the cathode of the fuel cell 1 is liquefied to increase the amount of the water retrieved from the fuel cell 1. In the opposite case, the third PI controller 323 controls the first heat-exchanger 61 and the fan 610 attached to the first heat-exchanger 61 in an opposite manner.

The fuel concentration sensor 91, a device for measuring the fuel concentration and temperature of the fuel flowing in the pipe, may be expensive. Also, as fine particles generated in an interior of the fuel cell system settle on a sensing part of the fuel concentration sensor 91 for a long period of time, accuracy and life span of the fuel concentration sensor 91 may deteriorate and be shortened. Accordingly, a filter for removing impurities may be installed in the pipe, but such a filter may cause a pressure drop in the pipe such that a pumping pressure of the supply pump 44 would be affected. Hereinafter, an example embodiment of controlling reaction conditions of the fuel in the fuel cell 1 in the fuel cell system without the fuel concentration sensor 91 will now be described.

FIG. 5 illustrates a block diagram of another example of the device for controlling reaction conditions of the fuel in the controller 3 illustrated in FIG. 2.

The configuration illustrated in FIG. 5 does not have such a fuel concentration sensor 91 as in the configuration illustrated in FIG. 3, but the reaction conditions of the fuel in the fuel cell 1 are still controlled without the fuel concentration sensor 91. With reference to FIG. 5, the apparatus for controlling a fuel state in the controller 3 include five adders 312, 313, 315, 316, and 317, the three PI controllers 321, 322, and 323, and the memory 34. A thermistor 93 for measuring the temperature of the fuel supplied to the fuel cell 1 is installed at an installation portion of the fuel concentration sensor 91, instead of the fuel concentration sensor 91.

The first adder 315 receives a target temperature of the surface of the fuel cell 1 at a current external temperature of the fuel cell system, receives a current temperature of the surface of the fuel cell 1 from the thermistor 93 positioned at a part where the fuel supplied to the fuel cell 1 flows (e.g., at the pipe between the fuel cell 1 and the mixer 80), and calculates a difference between the values. The second adder 316 receives a target output of the fuel cell 1 at a current usage time of the fuel cell 1 from the memory 34, receives a current output of the fuel cell 1 from the FC measuring unit 5, and calculates a difference between the values.

The fuel cell 1 may be degraded with accumulated use or house of operation, and a maximum output of the fuel cell 1 may be reduced according to the degree of degradation of the fuel cell 1. Thus, the target output of the fuel cell 1 over the current usage time of the fuel cell 1 may vary. Meanwhile, the fuel cell 1 may be degraded by other causes, such as a usage environment or the like, of the fuel cell 1, so the target output of the fuel cell 1 at a variable state of the fuel cell 1 other than the current usage time of the fuel cell 1 may be considered. A representative indicator indicating the output of the fuel cell 1 may be an output voltage of the fuel cell 1. Thus, in the example embodiment illustrated in FIG. 5, the output voltage of the fuel cell 1 is used as the output of the fuel cell 1, but those skilled in the art to which the present example embodiment pertains will understand that a different indicator such as an output current or the like of the fuel cell 1 may be used.

A first multiplier 351 multiplies the difference value output from the first adder 315 by a first weight value. A second multiplier 352 multiples a difference value output from the second adder 316 by a second weight value. The third adder 317 adds a value output from the first multiplier 351 and a value output from the second multiplier 352. The value calculated by the third adder 317 corresponds to an estimated value of a difference between a target concentration of the fuel at the current external temperature of the fuel cell system and a current fuel concentration. As described above, the difference between the target temperature of the surface of the fuel cell 1 and the current temperature is proportional to the correction value of the current concentration of the fuel to reach the target temperature. Also, when the concentration of the fuel supplied to the fuel cell 1 increases while the fuel cell 1 is operating in a normal state, the output from the fuel cell 1 is increased, and when the concentration of the fuel supplied to the fuel cell 1 decreases while the fuel cell 1 is operating in a normal state, the output from the fuel cell 1 is reduced. Thus, the difference between the target output of the fuel cell 1 and the current output, for example, a difference between a target voltage of the fuel cell 1 and a current voltage is proportionate to the correction value of the current fuel concentration. The difference between the target concentration of the fuel at the current external temperature of the fuel cell system and the current concentration of the fuel may be estimated by multiplying each of the foregoing difference values by an appropriate weight value and then adding the resultant values. Here, the weight values may be determined through an experiment or the like.

The first PI controller 321 controls a peripheral device of the fuel cell 1, e.g., the supply pump 44 for supplying fuel to the fuel cell 1, which affects the concentration of the fuel supplied to the fuel cell 1 according to the value output from the third adder 317. For example, when the value output from the third adder 317 increases, the first PI controller 321 increases the pumping amount of the fuel of the supply pump 44 in order to increase the concentration of the fuel. The increase in the value output from the third adder 317 means that the difference between the target concentration of the fuel at the current external temperature of the fuel cell system and the current fuel concentration increases, and thus the first PI controller 321 increases the pumping amount of the fuel of the supply pump 44. In an opposite case, the first PI controller 321 controls the supply pump 44 in an opposite manner.

In this case, since the responsiveness of the fuel cell 1 to the concentration of the fuel supplied to the fuel cell 1 may be low in terms of the characteristics of the fuel cell 1, a change in the temperature of the surface of the fuel cell 1 according to the change in the concentration of the fuel supplied to the fuel cell 1 may appear late. Thus, when the pumping amount of the fuel of the supply pump 44 is controlled by the estimated value of the difference between the target concentration of the fuel (calculated from the current temperature or the like of the surface of the fuel cell 1 fed back from the thermistor 93) and the current concentration of the fuel, rather than by a value detected by the fuel concentration sensor 91, the controller 3 continues to control the supply of the fuel to the supply pump 44 even when the fuel corresponding to the estimated value of the difference between the target concentration of the fuel and the current concentration of the fuel has been supplied to the fuel cell 1. Compared with the case of using the fuel concentration sensor 91, when the concentration of the fuel is controlled by using the current temperature or the like of the surface of the fuel cell 1 fed back from the thermistor 93, a usage amount of the fuel may increase.

Figure 6:
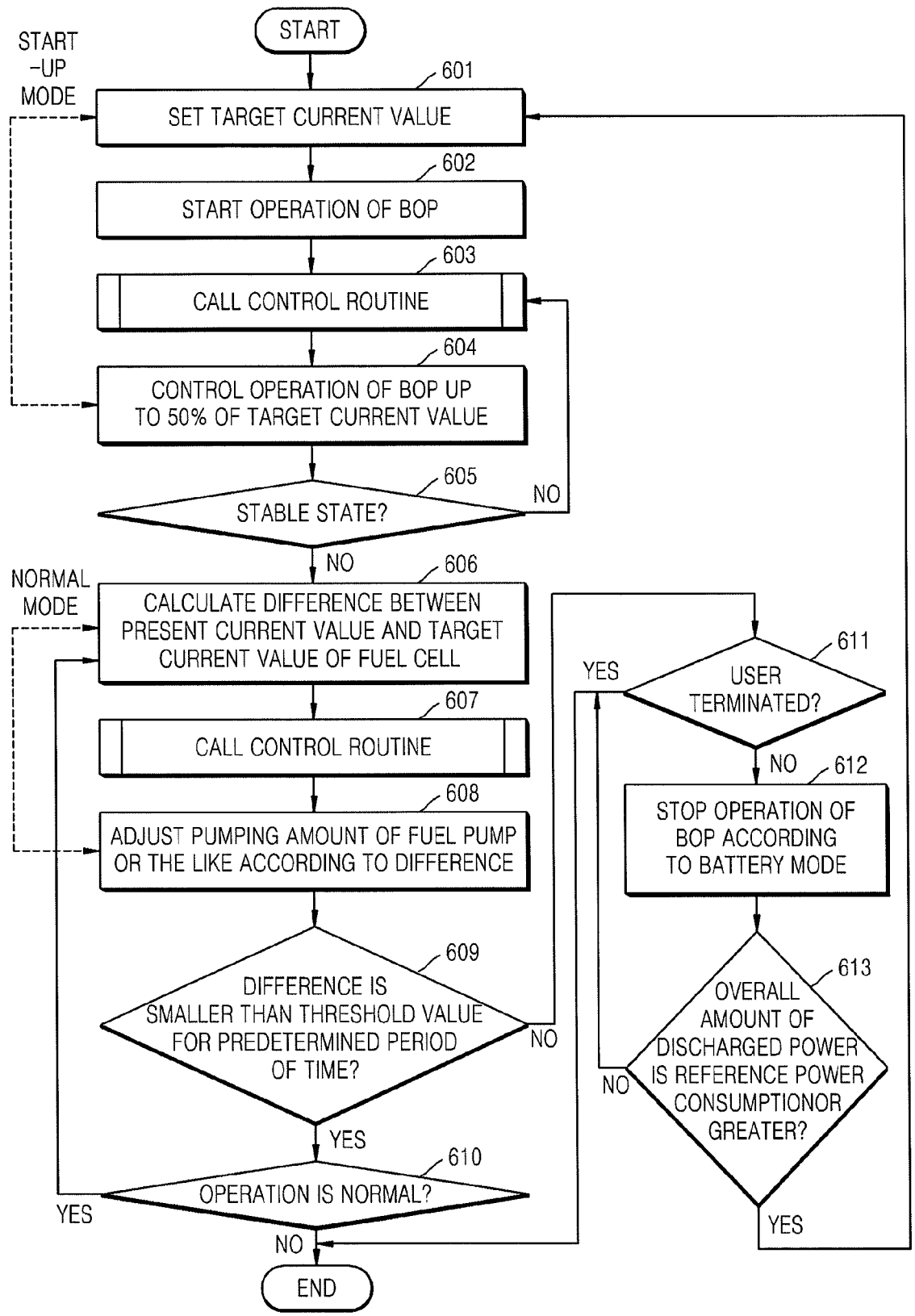
FIG. 6 illustrates a flowchart of a method of operating a fuel cell system according to an example embodiment.

FIG. 6 illustrates a flowchart of a method of operating a fuel cell system according to an example embodiment.

With reference to FIG. 6, the method of operating a fuel cell system according to the present example embodiment includes operations time-serially performed by the controller 3 illustrated in FIG. 1. Thus, the content described above regarding the fuel cell system illustrated in FIG. 1 may be applied to the method of operating a fuel cell system according to the present example embodiment, although it is omitted in the following description. In particular, the example embodiment illustrated in FIG. 6 relates to an operation of the controller 3 for appropriately distributing the power of the fuel cell 1 and the power of the battery 6 to the load 7 according to a change in the output from the fuel cell 1.

In operation 601 of FIG. 6, the controller 3 sets a target current value of the fuel cell system to start a start-up mode for starting the fuel cell 41, among various operation modes of the fuel cell system. When a target current value fitting a current state of the fuel cell 1 has been already set (such as when the start-up mode, upon being changed from a battery mode, as shown in FIG. 6 or the like, starts), the controller 3 may start the start-up mode in operation 602, skipping the operation 601. In operation 602, the controller 3 starts to operate the fuel pump, the air pump, or the like of the BOP 2 to supply fuel, air, or the like to the fuel cell 1 to start the fuel cell 1, and controls a pumping operation of the fuel pump, the air pump, or the like of the BOP 2 with reference to a supply amount of the fuel, air, or the like to warm up the fuel cell 1.

Figure 7:
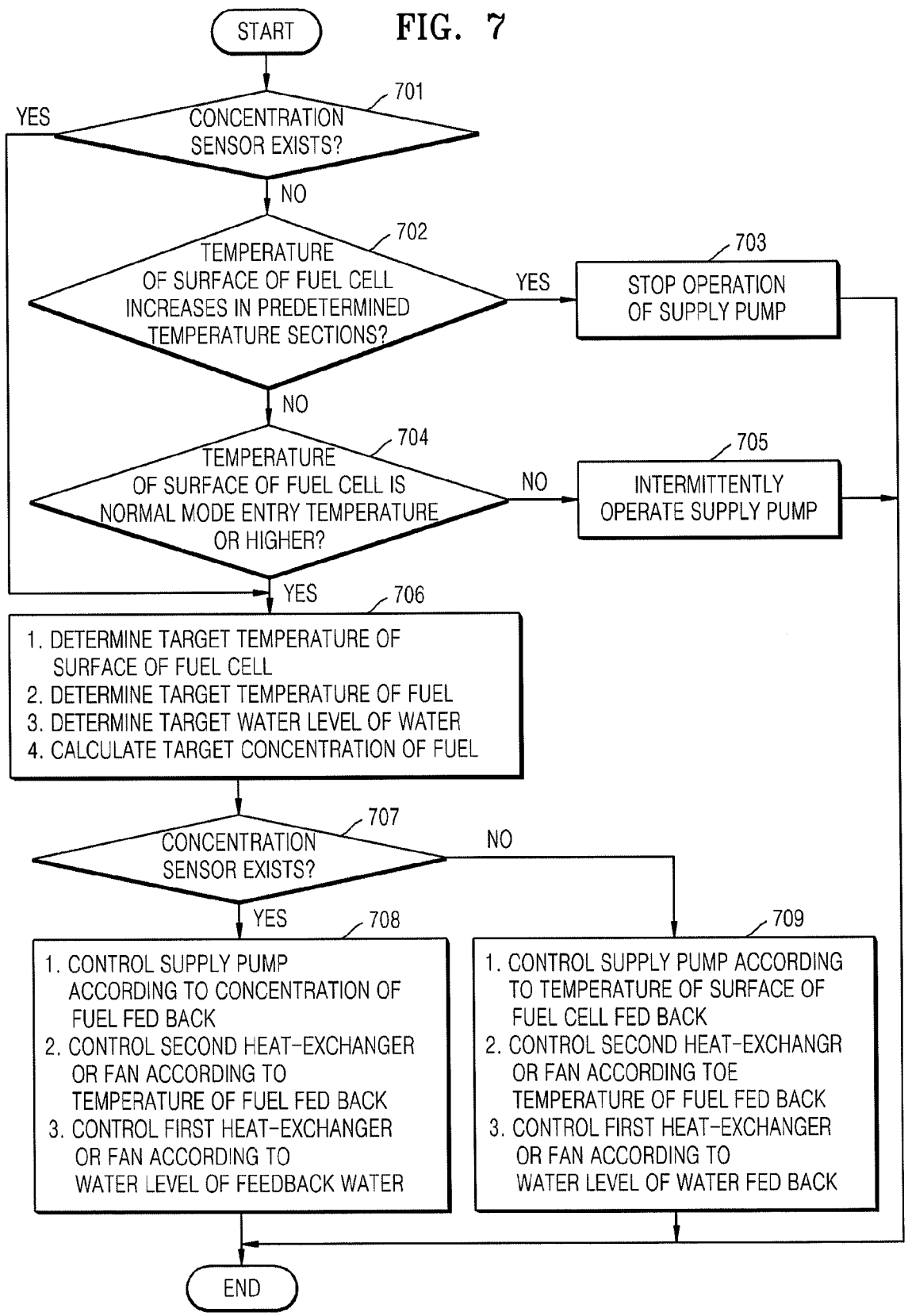
FIG. 7 illustrates a flowchart of a process of a control routine called in operations illustrated in FIG. 6.

In operation 603 of FIG. 6, the controller 3 calls a routine for controlling reaction conditions of the fuel such that the reaction conditions of the fuel in the fuel cell 1 are optimized in a current external environment of the fuel cell system (the routine for controlling the reaction conditions of the fuel is illustrated in FIG. 7 and it will be described in detail with reference to FIG. 7, below). In operation 604, the controller 3 controls the pumping operation of the fuel pump, the air pump, or the like of the BOP 2 to increase a value of a present output current of the fuel cell 1 up to 50% of the target current value. When the current external environment of the fuel cell system rapidly changes in the middle of increasing the pumping amount of the fuel pump, the air pump, or the like of the BOP 2 to increase the present output current of the fuel cell 41 up to 50% of the target current value, the process is returned to operation 603 from operation 604 to perform operation 603 and then operation 604. Namely, operation 603 and operation 605 may not be necessarily sequentially performed but may be performed in a circular manner.

In operation 605 of FIG. 6, when the present output current value of the fuel cell 1 measured by the FC measuring unit 5 reaches a stable state corresponding to 50% of the target current value, the controller 3 terminates the start-up mode, selects a normal mode in which power is generated in the fuel cell 1 according to consumed power of the load 7, charged power of the battery 6, and consumed power of the BOP 2 from among various operation modes of the fuel cell system, and proceeds with operation 606. Otherwise, the controller 3 returns to operation 603. Here, the stable state of the fuel cell 1 refers to a state in which an electrochemical reaction environment such as a catalyst temperature in the fuel cell 1 or the like is stabilized enough to flexibly cope with a change in consumed power or the like of the load 7. Thus, 50% of the target current value is merely illustrative and may be changed according to the state of the fuel cell 1.

In operation 606 of FIG. 6, the controller 3 calculates a difference between the present output current value of the fuel cell 1 and a target current value of the fuel cell at a predetermined interval unit, e.g., 1 sec. In operation 607, the controller 3 calls the routine for controlling the reaction conditions of the fuel such that the reaction conditions of the fuel in the fuel cell 1 are optimized in the current external environment of the fuel cell system. In operation 608, the controller 3 adjusts the pumping amount of the fuel pump, the air pump, or the like of the BOP 2 according to a change in the calculated difference. When the current external environment of the fuel cell system rapidly changes in the middle of adjusting the pumping amount of the fuel pump, the air pump, or the like of the BOP 2, the process is returned to operation 607 from operation 55608, operation 607 is performed, and then operation 608 may be performed again. Thus, operation 607 and operation 608 may not be necessarily performed but performed in a circular manner.

In operation 609 of FIG. 6, when the difference between the value of the present output current of the fuel cell 1 and the target current is smaller than a threshold value for a predetermined period of time, the controller 3 proceeds with operation 610. Otherwise, the controller 3 terminates the normal mode, selects a battery mode for supplying only output power of the battery 6 to the load 7, and proceeds with operation 611. In operation 610, the controller 3 checks the operations of the fuel cell 1, the BOP 2, and the like of the fuel cell system, and when the operations of the fuel cell 1, BOP 2, and the like are normal, the process is returned to operation 606. When the operations of the fuel cell 1, BOP 2, and the like, are not normal, the controller 3 terminates the operation of the fuel cell system. Operation 610 may be inserted between other operations performed in operating the fuel cell system.

In operation 611 of FIG. 6, the controller 3 checks whether or not an operation termination command of the fuel cell system is input by the user. When the operation termination command of the fuel cell system is input, the controller 3 terminates the operation of the fuel cell system. When the operation termination command of the fuel cell system is not input, the controller 3 proceeds with operation 612. Operation 611 may be inserted between other operations performed in operating the fuel cell system. In operation 612, the controller 3 stops the BOP 2 in order to supply only output power of the battery 6 to the load 7 according to the battery mode. In operation 613, when an overall amount of discharged power or a corresponding value of the battery 6 according to discharge of the battery 6 in the battery mode is a reference amount of power consumption or greater, the controller 3 selects the start-up mode to start the fuel cell 1 from among the various operation modes of the fuel cell system, and proceeds with operation 601. If not, the controller 3 returns to operation 611. Power consumption of the load 7 in the battery mode corresponding to the overall discharge power amount of the battery 6 may be used instead of the overall discharge power amount of the battery 6.

FIG. 7 illustrates a flowchart of a process of a control routine called in operation 603 and operation 607 illustrated in FIG. 6.

In the example embodiment shown in FIG. 7, the control routine called in operation 603 and operation 607 includes operations processed time-serially by the controller 3 illustrated in FIG. 1. Thus, the content described above regarding the fuel cell system illustrated in FIG. 1 may be applied to the control routine called in operation 603 and operation 607 illustrated in FIG. 6, although it is omitted in the following description. The control routine illustrated in FIG. 7 corresponds to a method of controlling the reaction conditions of the fuel such that the reaction conditions of the fuel in the fuel cell 1 are optimized in the current external environment of the fuel cell system.

In operation 701 of FIG. 7, the controller 3 determines whether or not the fuel concentration sensor 91 exists. For example, when only the temperature of the fuel supplied to the fuel cell 1 is output from the sensor positioned at the pipe between the fuel cell 1 and the mixer 80, the controller 3 detects that the sensor is a thermistor. Meanwhile, when the fuel concentration and temperature of the fuel supplied to the fuel cell are output together from the sensor positioned at the pipe between the fuel cell 1 and the mixer 80, the controller 3 detects that the sensor is the fuel concentration sensor 91. Also, when the fuel concentration detection function of the fuel concentration sensor 91 does not operate normally, the controller 3 may detect that the fuel concentration sensor 91 does not exist. When it is detected that the fuel concentration sensor 91 does not exist, operation 702 is performed, or otherwise, operation 704 is performed. In this manner, in the example embodiment illustrated in FIG. 7, the presence or absence of the fuel concentration sensor 91 is automatically detected and the peripheral devices of the fuel cell 1 are controlled according to the detection results, and thus, the fuel cell system may be generally used regardless of whether or not the fuel concentration sensor 91 is mounted in the fuel cell system, or whether or not the fuel concentration sensor 91 is broken down.

In operation 702 of FIG. 7, the controller 3 determines whether the temperature of the surface of the fuel cell 1 is within predetermined temperature sections and increases in the temperature sections, based on output values from the thermistor 92 positioned on the surface of the fuel cell 1. When the temperature of the surface of the fuel cell 1 is within predetermined temperature sections and increases in the temperature sections, operation 703 is performed, or otherwise, operation 704 is performed. In operation 703, the controller 3 temporarily stops the operation of the supply pump 44 for supplying fuel to the fuel cell 1.

The fuel cell 1 in the start-up mode may have a lower temperature than in the normal mode, and its responsiveness to the concentration of the fuel may be very low. Thus, since the change in the concentration of the fuel according to the amount of the fuel supplied to the fuel cell 1 in the fuel cell system in the start-up mode may appear very late, when the supply pump 44 is controlled by a control signal (generated from an estimated value of a difference between a target concentration and a current concentration of the fuel calculated from the current temperature of the surface of the fuel cell 1 or the like), a change in the temperature of the surface of the fuel cell 1 may not appear immediately. Then, since the change in the temperature of the surface of the fuel cell 1 corresponding to the estimated value may not be detected (even though the fuel corresponding to the estimated value has been supplied to the fuel cell 1 by the supply pump 44), the controller 3 may control the supply pump to continuously supply fuel, resulting in fuel being excessively supplied to the fuel cell 1. Thus, in the example embodiment illustrated in FIG. 7, the temperature range of the surface of the fuel cell 1 corresponding to the start-up mode is divided into several sections, and when the temperature of the surface of the fuel cell 1 increases in the predetermined sections, it is determined that the fuel has been already supplied to the fuel cell 1 and the operation of the supply pump 44 is temporarily stopped in order to prevent an excess supply of the fuel to the fuel cell 1. For example, when the temperature of the surface of the fuel cell 1 increases in sections of 23° C. to 25° C., 27° C. to 30° C., 37° C. to 40° C., and 47° C. to 50° C., the controller 3 may temporarily stop the operation of the supply pump 44.

In operation 704 of FIG. 7, when the temperature of the surface of the fuel cell 1 is a normal mode entry temperature or higher, operation 706 is performed, or otherwise, operation 705 is performed. When the temperature of the surface of the fuel cell 1 is lower than the normal mode entry temperature, e.g., 60° C., it means that the temperature of the surface of the fuel cell 1 is within a temperature range corresponding to the start-up mode. In operation 705, the controller 3 intermittently operates the supply pump 44 so that a predetermined voltage is output from the fuel cell 1. Operation 705 corresponds to a controlling operation of the controller 3 when the temperature of the surface of the fuel cell 1 is within the temperature range corresponding to the start-up mode, but belongs to sections other than the foregoing predetermined temperature sections or does not increase in the predetermined temperature sections. Thus, the controller 3 supplies fuel sufficient for a predetermined voltage to be output from the fuel cell 1 so as not to excessively supply fuel to the fuel cell 1 in consideration of the responsiveness of the fuel cell 1 in the start-up mode. In this case, when the temperature of the surface of the fuel cell 1 is a normal mode entry temperature or higher, e.g., 60° C. or higher, the responsiveness of the fuel cell 1 is improved, and thus the controller 3 can control the supply pump 44 by using the estimated value of the difference between the target concentration and the current concentration of the fuel calculated from the current temperature of the surface of the fuel cell 1 or the like, as described hereinafter.

In operation 706 of FIG. 7, the controller 3 determines the target temperature of the surface of the fuel cell 1 at the current external temperature of the fuel cell system based on the correspondence relationship of the change in the temperature of the surface of the fuel cell 1 to the change in the external temperature of the fuel cell system. Also, the controller 3 determines the target temperature of the fuel supplied to the fuel cell 1 at the current external temperature of the fuel cell system based on the correspondence relationship of the change in the temperature of the fuel supplied to the fuel cell 1 to the change in the external temperature of the fuel cell system. Also, the controller 3 determines the target water level of the water retrieved from the fuel cell 1 at the current external temperature of the fuel cell system on the basis of the correspondence relationship of the change in the water level of the water retrieved from the fuel cell 1 to the change in the external temperature of the fuel cell system. Also, the controller 3 calculates the target concentration of the fuel to be supplied to the fuel cell 1 at the current external temperature of the fuel cell system from the difference between the target temperature of the surface of the fuel cell 1 and the current temperature of the surface of the fuel cell 1 at the current external temperature of the fuel cell system.

In operation 707 of FIG. 7, when the controller 3 detects that the fuel concentration sensor 91 does not exist (in operation 701), operation 708 is performed, or otherwise, operation 709 is performed. In operation 708, the controller 3 controls the supply pump 44 such that the current concentration of fuel fed back from the fuel concentration sensor 91 follows the target concentration of the fuel supplied to the fuel cell 1 at the current external temperature of the fuel cell system. Also, the controller 3 controls at least one of the second heat-exchanger 62 positioned at the pipe where the fuel supplied to the fuel cell 1 flows and the fan 620 attached to the second heat-exchanger 62 such that the current temperature of the fuel fed back from the fuel concentration sensor 91 follows the target temperature at the current external temperature of the fuel cell system. Also, the controller 3 controls at least one of the first heat-exchanger 61 positioned at the pipe where water retrieved from the fuel cell 1 flows and the fan 610 attached to the first heat-exchanger 61 such that the current water level of the water fed back from the water level sensor 510 follows the target water level of the water retrieved from the fuel cell 1 at the current external temperature of the fuel cell system.

In operation 709 of FIG. 7, the controller 3 estimates the difference between the target concentration and the current concentration of the fuel at the current external temperature of the fuel cell system (e.g., from the difference between the target temperature of the surface of the fuel cell 1 at the current external temperature of the fuel cell system and the current temperature of the surface of the fuel cell 1 fed back from the thermistor 93 or the like), and controls the supply pump 44 for supplying fuel to the fuel cell 1 according to the estimated value. Also, the controller 3 controls at least one of the second heat-exchanger 62 (positioned at the pipe where the fuel supplied to the fuel cell flows) and the fan 620 (attached to the second heat-exchanger 62) such that the current temperature of the fuel fed back from the thermistor 93 follows the target temperature at the current external temperature of the fuel cell system. Also, the controller 3 controls at least one of the first heat-exchanger 61 (positioned at the pipe where water retrieved from the fuel cell) and the fan 610 (attached to the first heat-exchanger 61) such that the current water level of the water fed back from the water level sensor 510 follows the target water level of the water retrieved from the fuel cell 1 at the current external temperature of the fuel cell system.

By way of summation and review, a fuel cell may not normally operate when an inappropriate amount of a substance is supplied thereto. Accordingly, as described above, according to the one or more of the above example embodiments, the peripheral devices of the fuel cell may be controlled according to a variable target value of each of the factors determining the reaction conditions of the fuel in the current external environment of the fuel cell system. Thus, the fuel cell may be normally operated even when the external environment of the fuel cell system changes rapidly or even in an extreme environment.

Also provided are methods of controlling reaction conditions of fuel within the fuel cell of the fuel cell. A target value of each of factors in a fuel cell system may be determined based on a correspondence relationship of a change in each of factors determining reaction conditions of fuel in a fuel cell with respect to a change in an external environment of the fuel cell system, and peripheral devices of the fuel cell affecting the reaction conditions of the fuel in the fuel cell may be controlled according to a target value of each of the factors.

Also, provided are computer-readable recording mediums including programs for executing the control methods in computers. The control method executed by the controller 3 may be recorded as a program which may be executed in a computer and implemented in a general-purpose digital computer operating the program by using a computer-readable recording medium. The computer-readable recording medium includes storage mediums such as magnetic storage mediums (e.g., ROM, floppy disks, hard disks, etc.), optical recording mediums (e.g., CD-ROMs, or DVDs, etc.), or the like.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of controlling reaction conditions of fuel in a fuel cell of a fuel cell system, the method comprising:
    obtaining information regarding a current external environment of the fuel cell system;
    determining a target temperature of a surface of the fuel cell, the target temperature of the surface of the fuel cell varying corresponding to the obtained information, the determination of the target temperature of the surface of the fuel cell being based on a correspondence relationship of a change of the temperature of the surface of the fuel cell with respect to a change in an external environment of the fuel cell system; and
    controlling peripheral devices of the fuel cell that affect the reaction conditions of the fuel in the fuel cell according to the target temperature of the surface of the fuel cell, the controlling including adjusting a current concentration of the fuel whereby the current concentration of the fuel is increased or decreased, wherein the current concentration of the fuel is calculated from the difference between the target temperature of the surface of the fuel cell and a current temperature of the surface of the fuel cell by using the following Equation:

$$C(t) = C_i + K_2\left(K_1 e(t) + \frac{e(t) - e(t')}{t - t'}\right),$$

wherein:
    $C_i$ is an initial concentration of the fuel at a point in time when the fuel cell system starts to operate,
    $K_1$ and $K_2$ are proportional constants,
    $e(t)$ is the difference between the target temperature of the surface of the fuel cell and the current temperature at the current time t, and
    $e(t')$ is the difference between the target temperature of the surface of the fuel cell and the current temperature at a previous time t'.

2. The method of claim 1, wherein:
    controlling the peripheral devices includes controlling a pump for supplying the fuel to the fuel cell such that the current temperature of the surface of the fuel cell follows the target temperature of the surface of the fuel cell by using the difference between the target temperature of the surface of the fuel cell and the current temperature of the fuel cell.

3. The method of claim 2, wherein controlling the peripheral devices includes calculating a target concentration of the fuel supplied to the fuel cell from the difference between the target temperature of the surface of the fuel cell and the current temperature of the surface of the fuel cell, and controlling the pump such that the current concentration of the fuel follows the target concentration of the fuel to make the current temperature of the surface of the fuel cell follow the target temperature of the surface of the fuel cell.

4. The method of claim 3, wherein controlling the peripheral devices includes estimating a difference between the target concentration of the fuel supplied to the fuel cell and the current concentration of the fuel supplied to the fuel cell from the difference between the target temperature of the surface of the fuel cell and the current temperature of the surface of the fuel cell and a difference between a target output of the fuel cell and a current output of the fuel cell, and controlling the pump according to the estimated difference to make the current temperature of the surface of the fuel cell follow the target temperature of the surface of the fuel cell.

5. The method of claim 1, further comprising:
    determining a target temperature of the fuel supplied to the fuel cell, and
    controlling the peripheral devices includes controlling at least one of a heat-exchanger positioned at a pipe where the fuel supplied to the fuel cell flows and a fan attached to the heat-exchanger such that a current temperature of the fuel follows the target temperature of the fuel by

27 using a difference between the target temperature of the fuel and the current temperature of the fuel.

6. The method of claim 1, further comprising:
determining a target water level of water retrieved from the fuel cell, and
controlling the peripheral devices includes controlling at least one of a heat-exchanger positioned at a pipe where water retrieved from the fuel cell flows and a fan attached to the heat-exchanger such that a current water level of the water retrieved from the fuel cell follows the target water level of the water retrieved from the fuel cell by using a difference between the target water level of the water retrieved from the fuel cell and the current water level of the water retrieved from the fuel cell.

7. The method of claim 1, wherein the method includes determining the target temperature of a surface of the fuel cell, a target temperature of the fuel, and a target water level of water retrieved from the fuel cell.

8. The method of claim 7, wherein controlling the peripheral devices includes simultaneously controlling the peripheral devices according to the target temperature of the surface of the fuel cell, the target temperature of the fuel, and the target water level of the water retrieved from the fuel cell.

9. The method of claim 1, wherein the information includes information regarding at least one of a current external temperature and current external humidity of the fuel cell system.

10. The method of claim 9, wherein the correspondence relationship is a nonlinear correspondence relationship of the change in the temperature of the surface of the fuel cell with respect to a change in an external temperature of the fuel cell system.

11. The method of claim 1, wherein the correspondence relationship includes a correspondence relationship of a change in the temperature of the surface of the fuel cell to a change in a temperature between a lowest point and a highest point of a predetermined temperature section.

12. The method of claim 11, wherein the correspondence relationship includes a correspondence relationship of a change in the temperature of the surface of the fuel cell to a change in a temperature in each of a plurality of sub-sections of the predetermined temperature section.

13. The method of claim 12, wherein the sub-sections include first to third sub-sections, and the correspondence relationship includes a first function in the first sub-section, a second function in the second sub-section, and a third function in the third sub-section.

14. The method of claim 13, wherein each of the first to third functions is any one of a linear function and a nonlinear function.

15. A computer-readable recording medium including a program for executing, in a computer, a method of controlling reaction conditions of fuel in a fuel cell of a fuel cell system, the method comprising:
obtaining information regarding a current external environment of the fuel cell system;
determining a target temperature of a surface of the fuel cell, the target temperature of the surface of the fuel cell varying corresponding to the obtained information, the determination of the target temperature of the surface of the fuel cell being based on a correspondence relationship of a change of the temperature of the surface of the fuel cell with respect to a change in an external environment of the fuel cell system; and
controlling peripheral devices of the fuel cell that affect the reaction conditions of the fuel in the fuel cell according to the target temperature of the surface of the fuel cell, the controlling including adjusting a current concentra-

28 tion of the fuel whereby the current concentration of the fuel is increased or decreased, wherein the current concentration of the fuel is calculated from the difference between the target temperature of the surface of the fuel cell and a current temperature of the surface of the fuel cell by using the following Equation:

$$C(t) = C_i + K_2\left(K_1 e(t) + \frac{e(t) - e(t')}{t - t'}\right),$$

wherein:
$C_i$ is an initial concentration of the fuel at a point in time when the fuel cell system starts to operate,
$K_1$ and $K_2$ are proportional constants,
$e(t)$ is the difference between the target temperature of the surface of the fuel cell and the current temperature at the current time t, and
$e(t')$ is the difference between the target temperature of the surface of the fuel cell and the current temperature at a previous time t'.

16. A method of controlling a concentration of fuel supplied to a fuel cell of a fuel cell system, the method comprising:
calculating a difference between a target temperature of a surface of the fuel call and a current temperature of the surface of the fuel cell;
calculating a difference between a target output of the fuel cell and a current output of the fuel cell;
estimating a difference between a target fuel concentration and a current fuel concentration from the calculated difference values; and
controlling a peripheral device of the fuel cell affecting the concentration of the fuel according to the estimated difference value, the controlling including adjusting a current concentration of the fuel whereby the current concentration of the fuel is increased or decreased, wherein the current concentration of the fuel is calculated from the difference between the target temperature of the surface of the fuel cell and the current temperature of the surface of the fuel cell by using the following Equation:

$$C(t) = C_i + K_2\left(K_1 e(t) + \frac{e(t) - e(t')}{t - t'}\right),$$

wherein:
$C_i$ is an initial concentration of the fuel at a point in time when the fuel cell system starts to operate,
$K_1$ and $K_2$ are proportional constants,
$e(t)$ is the difference between the target temperature of the surface of the fuel cell and the current temperature at the current time t, and
$e(t')$ is the difference between the target temperature of the surface of the fuel cell and the current temperature at a previous time t'.

17. The method of claim 16, wherein estimating the difference between the target fuel concentration and the current fuel concentration includes:
multiplying the calculated difference values by weight values; and
adding the difference values multiplied by the weight values.

18. The method of claim 16, wherein:
calculating the difference between the target temperature of the surface of the fuel cell and the current temperature of the surface of the fuel cell includes calculating the difference between the target temperature of the surface of the fuel cell and the current temperature of the surface of the fuel cell at a current external temperature of the fuel cell system, and estimating the difference between the target fuel concentration and the current fuel concentration includes estimating the difference between the target fuel concentration and the current concentration of the fuel cell at the current external temperature of the fuel cell system.

19. A computer-readable recording medium including a program for executing, in a computer, a method of controlling the concentration of fuel supplied to a fuel cell of a fuel cell system, the method comprising:

calculating a difference between a target temperature of a surface of the fuel call and a current temperature of the surface of the fuel cell;

calculating a difference between a target output of the fuel cell and a current output of the fuel cell;

estimating a difference between a target fuel concentration and a current fuel concentration from the calculated difference values; and controlling a peripheral device of the fuel cell affecting the concentration of the fuel according to the estimated difference value, the controlling including adjusting a current concentration of the fuel whereby the current concentration of the fuel is increased or decreased, wherein the current concentration of the fuel is calculated from the difference between the target temperature of the surface of the fuel cell and the current temperature of the surface of the fuel cell by using the following Equation:

$$C(t) = C_i + K_2 \left( K_1 e(t) + \frac{e(t) - e(t')}{t - t'} \right),$$

wherein:

$C_i$ is an initial concentration of the fuel at a point in time when the fuel cell system starts to operate, $K_1$ and $K_2$ are proportional constants, $e(t)$ is the difference between the target temperature of the surface of the fuel cell and the current temperature at the current time t, and $e(t')$ is the difference between the target temperature of the surface of the fuel cell and the current temperature at a previous time t'.

\* \* \* \* \*